United States Patent
Ujiie et al.

(10) Patent No.: US 11,943,233 B2
(45) Date of Patent: *Mar. 26, 2024

(54) VEHICLE COMMUNICATION APPARATUS, IN-VEHICLE NETWORK SYSTEM, AND VEHICLE COMMUNICATION METHOD

(71) Applicant: PANASONIC INTELLECTUAL PROPERTY CORPORATION OF AMERICA, Torrance, CA (US)

(72) Inventors: Yoshihiro Ujiie, Osaka (JP); Jun Anzai, Kanagawa (JP); Yoshihiko Kitamura, Tokyo (JP); Masato Tanabe, Kanagawa (JP); Hideki Matsushima, Tokyo (JP); Tomoyuki Haga, Nara (JP); Takeshi Kishikawa, Osaka (JP); Ryota Sugiyama, Shizuoka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 133 days.

This patent is subject to a terminal disclaimer.

(21) Appl. No.: 17/559,749

(22) Filed: Dec. 22, 2021

(65) Prior Publication Data
US 2022/0116405 A1   Apr. 14, 2022

Related U.S. Application Data

(63) Continuation of application No. 15/930,093, filed on May 12, 2020, now Pat. No. 11,240,253, which is a
(Continued)

(30) Foreign Application Priority Data
Jul. 29, 2015   (JP) .................................. 2015-150050

(51) Int. Cl.
*H04L 29/00* (2006.01)
*B60R 16/023* (2006.01)
(Continued)

(52) U.S. Cl.
CPC .......... *H04L 63/123* (2013.01); *B60R 16/023* (2013.01); *H04L 12/40* (2013.01);
(Continued)

(58) Field of Classification Search
CPC ..... H04L 63/123; H04L 63/102; H04L 67/12; H04L 12/40; H04L 63/08; H04L 63/20;
(Continued)

(56) References Cited

U.S. PATENT DOCUMENTS

2006/0274467 A1* 12/2006 Nagasawa ........... H04L 12/4135
361/62
2007/0171921 A1* 7/2007 Wookey ................. H04L 63/10
707/E17.013
(Continued)

FOREIGN PATENT DOCUMENTS

CN   105594156   5/2016
JP   2005-005927   1/2005
(Continued)

OTHER PUBLICATIONS

Official Communication issued in World Intellectual Property Organization Patent Application No. PCT/JP2015/004236, dated Jun. 29, 2016, along with an English language translation thereof.
(Continued)

*Primary Examiner* — Jeffrey C Pwu
*Assistant Examiner* — Helai Salehi
(74) *Attorney, Agent, or Firm* — Greenblum & Bernstein, P.L.C.

(57) ABSTRACT

An electronic control unit is connected to a network in an in-vehicle network system. The electronic control unit
(Continued)

includes a first control circuit and a second control circuit. The first control circuit is connected to the network via the second control circuit. The second control circuit performs a first determination process on a frame to determine conformity of the frame with a first rule. Upon determining that the frame conforms to the first rule, the second control circuit transmits the frame to the first control circuit. The first control circuit performs a second determination process on the frame to determine conformity of the frame with a second rule. The second rule is different from the first rule.

16 Claims, 23 Drawing Sheets

Related U.S. Application Data continuation of application No. 16/217,460, filed on Dec. 12, 2018, now Pat. No. 10,693,889, which is a continuation of application No. 15/407,738, filed on Jan. 17, 2017, now Pat. No. 10,193,896, which is a continuation of application No. PCT/JP2015/004236, filed on Aug. 25, 2015.

(60) Provisional application No. 62/049,668, filed on Sep. 12, 2014.

(51) Int. Cl.
  *H04L 9/40* (2022.01)
  *H04L 12/40* (2006.01)
  *H04L 67/12* (2022.01)

(52) U.S. Cl.
  CPC ............ *H04L 63/08* (2013.01); *H04L 63/102* (2013.01); *H04L 63/20* (2013.01); *H04L 67/12* (2013.01); *H04L 2012/40215* (2013.01); *H04L 2012/40273* (2013.01)

(58) Field of Classification Search
  CPC . H04L 2012/40273; H04L 2012/40215; H04L 29/06578; H04L 29/06986; H04L 63/0227; H04L 63/0254; B60R 16/023; G06F 21/10
  See application file for complete search history.

(56) References Cited

U.S. PATENT DOCUMENTS

| 2008/0219274 A1 | 9/2008 | Kato et al. |
| 2009/0248239 A1 | 10/2009 | Iwaki |
| 2012/0116633 A1 | 5/2012 | Kato et al. |
| 2014/0328352 A1 | 11/2014 | Mabuchi et al. |
| 2015/0066239 A1 | 3/2015 | Mabuchi |
| 2015/0358351 A1 | 12/2015 | Otsuka et al. |

FOREIGN PATENT DOCUMENTS

| JP | 2007-038904 | 2/2007 | |
| JP | 2009-234444 | 10/2009 | |
| JP | 2013-082352 | 5/2013 | |
| JP | 2013-131907 | 7/2013 | |
| JP | 2013-187555 | 9/2013 | |
| JP | 2014-138380 | 7/2014 | |
| JP | 2014-146868 | 8/2014 | |
| WO | 2013/144962 | 10/2013 | |
| WO | WO-2013144962 A1 * | 10/2013 | ........... G06F 21/604 |

OTHER PUBLICATIONS

The Extended European Search Report dated Jul. 5, 2017 for the related European Patent Application No. 15839733.1.
International Search Report of PCT application No. PCT/JP2015/004236 dated Nov. 10, 2015.
CAN Specification 2.0, Sep. 1991, [online], CAN in Automation (CiA), [searched on Nov. 4, 2014], Internet<URL: http://www.can-cia.org/fileadmin/cia/specifications/CAN20A.pdf>.
Satoshi Otsuka et al., "Intrusion Detection for In-vehicle Networks without Modifying Legacy ECUs", IPSJ SIG Technical Report, vol. 2013-SLDM-160 No. 6 / vol. 2013—EMB-28 No. 6, pp. 1-5, Mar. 13, 2013.
English Translation of Chinese Search Report from State Intellectual Property Office (SIPO) of the People's Republic of China dated Nov. 2, 2018 for the related Chinese Patent Application No. 201580022868.4.
Roland Kammerer et al., "Enhancing Security in CAN Systems using a Star Coupling Router", 7th IEEE International Symposium on Industrial Embedded Systems (SIES'12), pp. 237-246 (Jun. 22, 2012).
English Translation of Chinese Search Report from China National Intellectual Property Administration dated Mar. 4, 2021 for the related Chinese Patent Application No. 201910549608.2.

* cited by examiner

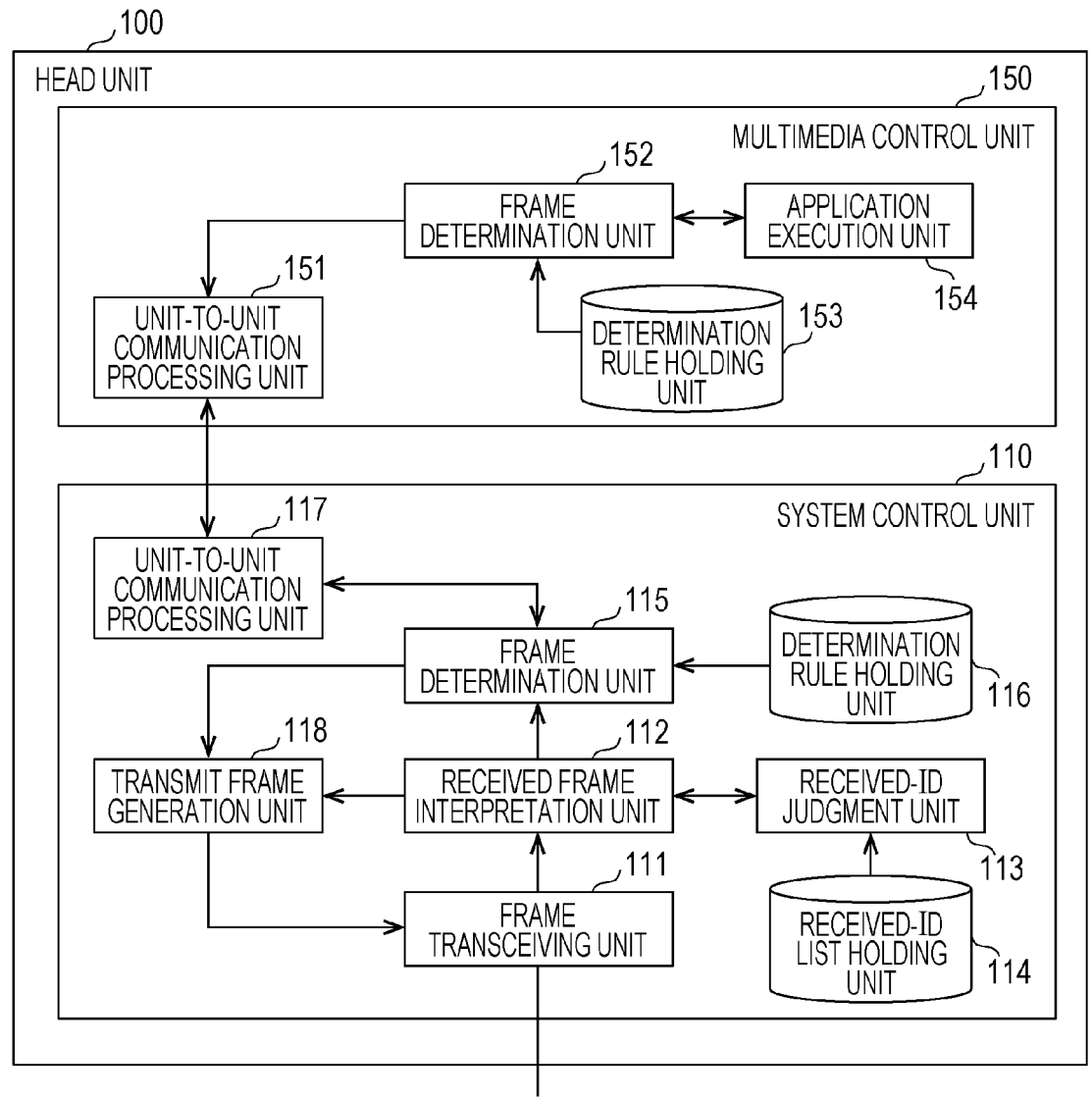

FIG. 6

| ID | TRANSMISSION/ RECEPTION TYPE (RECEPTION: 1, TRANSMISSION: 0) | DATA LENGTH | DATA RANGE (EXPRESSED IN HEXADECIMAL NOTATION) | | | | | | | | PERIOD (ms) | MARGIN (ms) | PRESENCE OR ABSENCE OF EVENT (PRESENCE: 1, ABSENCE: 0) | THRESHOLD FREQUENCY-OF-OCCURRENCE VALUE (NUMBER OF OCCURRENCES/SEC) |
|---|---|---|---|---|---|---|---|---|---|---|---|---|---|---|
| | | | 1 | 2 | 3 | 4 | 5 | 6 | 7 | 8 | | | | |
| 1 | 1 | 1 | 00 – B4 | - | - | - | - | - | - | - | 6 | 1 | 0 | - |
| 2 | 1 | 1 | 00 – 64 | - | - | - | - | - | - | - | 12 | 1 | 0 | - |
| 3 | 1 | 1 | 00, 01 | - | - | - | - | - | - | - | - | - | 1 | 100 |
| 4 | 1 | 1 | 00 – 64 | - | - | - | - | - | - | - | 48 | 1 | 1 | 100 |
| 5 | 0 | 6 | ** | ** | ** | ** | ** | ** | - | - | 1000 | 1 | 1 | 100 |
| 6 | 0 | 2 | 00 – 64 | ** | - | - | - | - | - | - | 12 | 1 | 0 | - |
| 7 | 0 | 6 | 03 | 92 | B4 | 92 | 63 | 88 | 90 | 11 | 48 | 1 | 1 | 100 |
| ... | ... | ... | ... | ... | ... | ... | ... | ... | ... | ... | ... | ... | ... | ... |

| RECEIVED-ID LIST |
|---|
| 1 |
| 2 |
| 3 |
| 4 |
| 5 |
| 6 |
| 7 |

FIG. 9

| ID | DATA |
|---|---|
| 1 | 0 |
| 1 | 1 |
| 1 | 2 |
| 1 | 3 |
| 1 | 4 |
| ... | ... |

FIG. 10

| ID | DATA |
|---|---|
| 2 | 100 |
| 2 | 90 |
| 2 | 80 |
| 2 | 70 |
| 2 | 60 |
| ... | ... |

FIG. 11

| ID | DATA |
|---|---|
| 3 | 1 |
| 3 | 1 |
| 3 | 0 |
| 3 | 0 |
| 3 | 0 |
| ... | ... |

FIG. 12

| ID | DATA |
|---|---|
| 4 | 0 |
| 4 | 10 |
| 4 | 20 |
| 4 | 30 |
| 4 | 40 |
| ... | ... |

VEHICLE COMMUNICATION APPARATUS, IN-VEHICLE NETWORK SYSTEM, AND VEHICLE COMMUNICATION METHOD

This is a continuation of U.S. patent application Ser. No. 15/930,093, filed May 12, 2020, which is a continuation of U.S. patent application Ser. No. 16/217,460, filed Dec. 12, 2018 (now U.S. Pat. No. 10,693,889, issued Jun. 23, 2020), which is a continuation of U.S. patent application Ser. No. 15/407,738, filed Jan. 17, 2017 (now U.S. Pat. No. 10,193,896, issued Jan. 29, 2019), which is a continuation of International Patent Appl. No. PCT/JP2015/004236, filed Aug. 25, 2015, which claims the benefit of U.S. Provisional Patent Appl. No. 62/049,668, filed Sep. 12, 2014, and priority to Japanese Patent Appl. No. 2015-150050, filed Jul. 29, 2015. The disclosure of each of the above-mentioned documents, including the specification, drawings, and claims, is incorporated herein by reference in its entirety.

BACKGROUND

1. Technical Field

The present disclosure relates to a vehicle communication apparatus connected to an in-vehicle network and configured to transmit and receive messages (frames), a vehicle communication method, and the like.

2. Description of the Related Art

Systems in recent automobiles accommodate multiple devices called electronic control units (ECUs). A network connecting these ECUs is called an in-vehicle network. There exist multiple standards for the in-vehicle network. Among these standards, a standard called CAN (Controller Area Network) specified in ISO 11898-1 is one of the most mainstream in-vehicle network standards (see "CAN Specification 2.0 Part A", [online], CAN in Automation (CiA), [searched Nov. 14, 2014], the Internet (URL: http://www.can-cia.org/fileadmin/cia/specifications/CAN20A.pdf)).

In CAN, each communication path is constituted by two buses, and ECUs connected to the buses are referred to as nodes. Each node connected to a bus transmits and receives a message called a frame. A transmitting node that is to transmit a frame applies a voltage to two buses to generate a potential difference between the buses, thereby transmitting the value "1" called recessive and the value "0" called dominant. When a plurality of transmitting nodes transmit recessive and dominant values at completely the same timing, the dominant value is prioritized and transmitted. A receiving node transmits a frame called an error frame if the format of a received frame is anomalous. In an error frame, 6 consecutive dominant bits are transmitted to notify the transmitting nodes or any other receiving node of frame anomaly.

In CAN, furthermore, there is no identifier that designates a transmission destination or a transmission source. A transmitting node transmits frames each assigned an ID called a message ID (that is, sends signals to a bus), and each receiving node receives only a predetermined message ID (that is, reads a signal from the bus). In addition, the Carrier Sense Multiple Access/Collision Avoidance (CSMA/CA) scheme is adopted, and arbitration based on message IDs is performed for simultaneous transmission of a plurality of nodes so that a frame with the value of message ID being small is preferentially transmitted.

Conventionally, there is known a technique in which, in a case where a message that is anomalous is transmitted to a CAN bus, a gateway device that connects buses detects the anomalous message and prevents the anomalous message from being transferred to any other bus to suppress an increase in the load on buses (see Japanese Unexamined Patent Application Publication No. 2007-38904). There is also known a technique for determining the presence of an unauthorized frame by checking the period of messages that are periodically sent (see Satoshi OTSUKA, Tasuku ISHIGOOKA, "Intrusion Detection for in-vehicle Networks without Modifying Legacy ECUs", Technical Report Embedded Systems (EMB), Information Processing Society of Japan, Mar. 6, 2013, Vol. 2013-EMB-28, No. 6, pp. 1-5).

If ECUs connected to the CAN bus include an ECU that executes an application program acquired from an external element such as an external network or an external device, an unauthorized operation can be performed in accordance with an unauthorized application program. The unauthorized application program can generate an unauthorized frame and deliver the unauthorized frame to the bus, thereby causing unauthorized control of the vehicle. In addition, the load on the bus may be increased. This incurs an increase in the load imposed on the bus by frame monitoring (checking).

SUMMARY

In one general aspect, the techniques disclosed here feature an electronic control unit connected to an in-vehicle network bus in an in-vehicle network system, the in-vehicle network system including a plurality of apparatuses that perform communication of frames via the in-vehicle network bus. The electronic control unit at least includes a first control circuit and a second control circuit. The first control circuit is connected to the in-vehicle network bus via the second control circuit over wired communication and/or wireless communication. The second control circuit performs a first determination process on a received frame that is received from the in-vehicle network bus, to which the second control circuit is connected, to determine a conformity of the received frame with a first rule related to at least a reception interval, and, upon determining that the received frame conforms to the first rule, executes a predetermined process based on content of the received frame. The first control circuit performs a second determination process on the received frame, received via the second control circuit, to determine a conformity of the received frame with a second rule that is different from the first rule.

These general and specific aspects may be implemented using a system, a method, and a computer program, and any combination of systems, methods, and computer programs.

According to an embodiment of the present disclosure, it is possible to reduce delivery of an unauthorized frame to a bus.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a configuration diagram of a head unit according to the first embodiment;

FIG. 5 is a diagram illustrating an example of a received-ID list in the head unit;

FIG. 6 is a diagram illustrating an example of a determination rule held in a determination rule holding unit;

FIG. 9 is a diagram illustrating an example of an ID and a data field in a frame transmitted from an ECU connected to an engine;

FIG. 10 is a diagram illustrating an example of an ID and a data field in a frame transmitted from an ECU connected to brakes;

FIG. 11 is a diagram illustrating an example of an ID and a data field in a frame transmitted from an ECU connected to a door open/close sensor;

FIG. 12 is a diagram illustrating an example of an ID and a data field in a frame transmitted from an ECU connected to a window open/close sensor;

Figure 1:
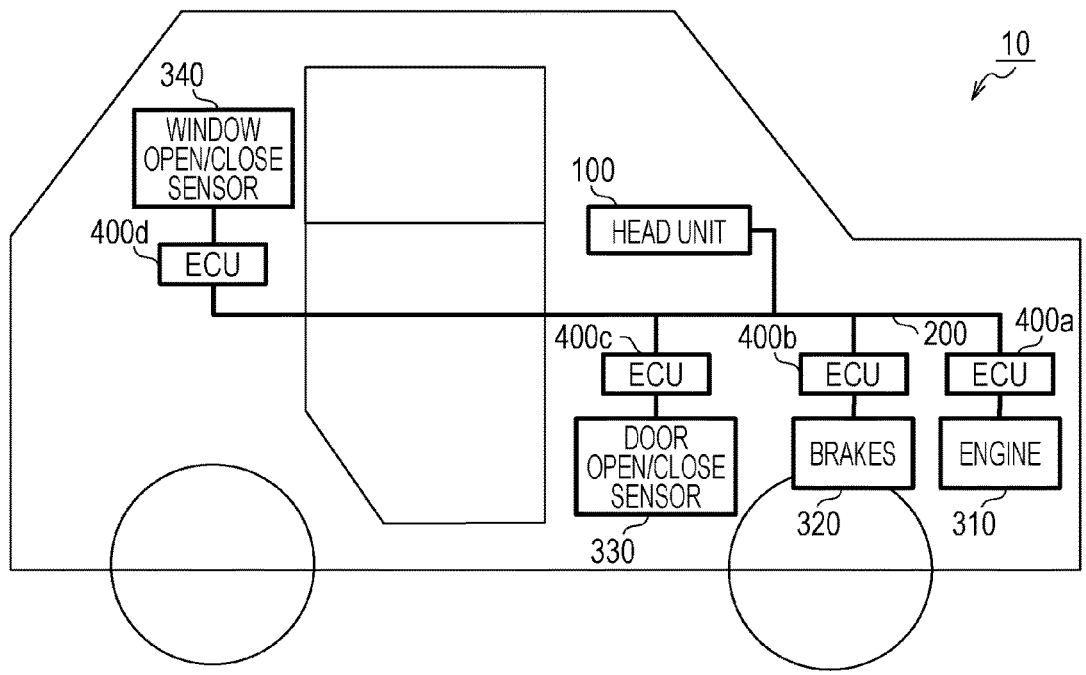
FIG. 1 is a diagram illustrating an overall configuration of an in-vehicle network system according to a first embodiment.

DETAILED DESCRIPTION (1) An electronic control unit according to an aspect of the present disclosure is an electronic control unit connected to an in-vehicle network bus in an in-vehicle network system, the in-vehicle network system including a plurality of apparatuses that perform communication of frames via the in-vehicle network bus, the electronic control unit including: a first control circuit; and a second control circuit, wherein the first control circuit is connected to the in-vehicle network bus via the second control circuit over wired communication and/or wireless communication, wherein the second control circuit performs a first determination process on a received frame that is received from the in-vehicle network bus, to which the second control circuit is connected, to determine a conformity of the received frame with a first rule related to at least a reception interval, and, upon determining that the received frame conforms to the first rule, executes a predetermined process based on content of the received frame, and wherein the first control circuit performs a second determination process on the received frame, received via the second control circuit, to determine a conformity of the received frame with a second rule that is different from the first rule.

This makes it possible to determine, for example, whether or not a frame whose content is designated by the first control circuit in accordance with, for example, an application program or the like is unauthorized in terms of (does not conform to) rules in the in-vehicle network system (such as criteria for the allowable range of data values, the transmission period, and how frequently transmission occurs). This determination is useful for reducing delivery of an unauthorized frame to the bus.

(2) In the aspect described above, the first rule may specify a condition for a period in which the received frame is received or how frequently the received frame is received.

This makes it possible to determine whether or not a frame received from the bus is unauthorized in terms of (does not conform to) rules in the in-vehicle network system (such as criteria for the allowable range of data values, the reception period, and how frequently reception occurs). This determination is useful for improving security in the in-vehicle network system. Additionally, the result of the determination may be available for the analysis of whether or not the reception of an unauthorized frame has caused delivery of the unauthorized frame to the bus, and may also be useful for reducing delivery of an unauthorized frame to the bus.

(3) In the aspect described above, upon determining that the received frame conforms to the first rule, the second control circuit may transmit the received frame to the first control circuit, and, upon determining that the received frame does not conform to the first rule, the second control circuit may not transmit the received frame to the first control circuit.

This may prevent a frame determined not to conform to a rule by one control circuit from being subjected to some processing by the other control circuit, and may reduce the processing burden on each control circuit.

(4) In the aspect described above, the first control circuit may be a semiconductor integrated circuit including a first microprocessor and a first memory, and may execute a program stored in the first memory by using the first microprocessor to perform the second determination process. The second control circuit may be a semiconductor integrated circuit including a second microprocessor and a second memory, the second microprocessor having a lower processing performance than the first microprocessor, and may execute a program stored in the second memory by using the second microprocessor to perform the first determination process.

This may provide appropriate sharing of processing according to the processing performance of each microprocessor.

(5) In the aspect described above, the electronic control unit may transmit, to an external server, information indicating a result of the first determination process and a result of the second determination process.

This allows the server device to analyze the conformity of a frame with a rule, and makes it possible to achieve an improvement in security for the in-vehicle network system by using the result of the analysis.

(6) In the aspect described above, the electronic control unit may record, on a predetermined recording medium, information indicating a result of the first determination process and a result of the second determination process.

This allows the analysis of information recorded on the recording medium, and makes it possible to achieve an improvement in security for the in-vehicle network system by using the result of the analysis.

(7) In the aspect described above, the plurality of apparatuses may include the electronic control unit and the plurality of apparatuses may perform the communication of frames in accordance with a Controller Area Network (CAN) protocol.

This makes it possible to achieve a reduction in delivery of an unauthorized frame to the bus in the in-vehicle network system in which communication is performed in accordance with the CAN protocol.

(8) An in-vehicle network system according to an aspect of the present disclosure is an in-vehicle network system including a plurality of apparatuses that perform communication of frames via an in-vehicle network bus, wherein at least one of the plurality of apparatuses comprises an electronic control unit connected to the in-vehicle network bus, wherein the electronic control unit at least includes a first control circuit and a second control circuit, wherein the first control circuit is connected to the in-vehicle network bus via the second control circuit over wired communication and/or wireless communication, wherein the second control circuit performs a first determination process on a received frame that is received from the in-vehicle network bus, to which the second control circuit is connected, to determine a conformity of the received frame with a first rule related to at least a reception interval, and, upon determining that the received frame conforms to the first rule, executes a predetermined received-frame-based process, based on a content of the received frame, and wherein the first control circuit performs a second determination process on the received frame received via the second control circuit to determine a conformity of the received frame with a second rule that is different from the first rule.

This makes it possible to reduce delivery of an unauthorized frame to the bus.

(9) A vehicle communication method according to an aspect of the present disclosure is a vehicle communication method for use in an in-vehicle network system including a plurality of apparatuses that perform communication of frames via an in-vehicle network bus, the plurality of apparatuses including a vehicle communication apparatus, the vehicle communication apparatus including a first control circuit and a second control circuit configured to exchange information on frames with the first control circuit via wired communication and/or wireless communication, the vehicle communication method including: performing, by the second control circuit, a first determination process on a received frame that is received from the in-vehicle network bus, to which the second control circuit is connected, to determine a conformity of the received frame with a first rule related to at least a reception interval; upon determining that the received frame conforms to the first rule, executing, by the second control circuit, a predetermined received-frame-based process based on a content of the received frame; and performing, by the first control circuit, a second determination process on the received frame, received via the second control circuit, to determine a conformity of the received frame with a second rule that is different from the first rule.

The determination in the vehicle communication method is useful for reducing delivery of an unauthorized frame to the bus.

It should be noted that these general or specific aspects may be implemented as a system, a method, an integrated circuit, a computer program, or a computer-readable recording medium such as a compact disc read-only memory (CD-ROM), or may be implemented as any combination of the system, the method, the integrated circuit, the computer program, or the recording medium.

In the following, an in-vehicle network system including a vehicle communication apparatus according to embodiments will be described with reference to the drawings. Each of the embodiments described below shows a specific example of the present disclosure. Thus, the numerical values, constituent elements, the way in which the constituent elements are arranged and connected, steps (processes), the processing order of the steps, etc. shown in the following embodiments are mere examples, and do not limit the scope of the present disclosure. Among the constituent elements in the following embodiments, constituent elements not recited in any one of the independent claims are constituent elements that can be optionally added. In addition, the drawings are schematic and not representative of exact proportions or dimensions.

First Embodiment

Hereinafter, as an embodiment of the present disclosure, an in-vehicle network system 10 including a vehicle communication apparatus (a head unit 100) that performs a vehicle communication method for determining the conformity of frames with a rule, the frames including a transmit frame and the like to be delivered to a bus, will be described with reference to the drawings.

1.1 Overall Configuration of In-Vehicle Network System 10

FIG. 1 is a diagram illustrating an overall configuration of the in-vehicle network system 10 according to a the first embodiment. The in-vehicle network system 10 is an example of a network communication system in which communication is performed in accordance with the CAN protocol, and is a network communication system in an automobile provided with various devices such as a control device and a sensor. The in-vehicle network system 10 includes a plurality of apparatuses that perform communication of frames via a bus and adopts a vehicle communication method. Specifically, as illustrated in FIG. 1, the in-vehicle network system 10 is configured to include a bus 200, a head unit 100, and nodes connected to the bus 200, called ECUs, such as ECUs 400a to 400d connected to various devices. While the in-vehicle network system 10 may include numerous ECUs other than the head unit 100 and the ECUs 400a to 400d, the description will be given here focusing on the head unit 100 and the ECUs 400a to 400d, for convenience, Each ECU is an apparatus including, for example, digital circuits such as a processor (microprocessor) and a memory, analog circuits, a communication circuit, and so on. The memory is a ROM, a RAM, or the like, and is capable of storing a control program (computer program) to be executed by the processor. For example, the processor operates in accordance with the control program (computer program), which results in the ECU implementing various functions. The computer program is constituted by a plurality of instruction codes indicating instructions for the processor to achieve a predetermined function.

The ECUs 400a to 400d are connected to the bus 200, and are connected to an engine 310, brakes 320, a door open/close sensor 330, and a window open/close sensor 340, respectively, Each of the ECUs 400a to 400d acquires the state of the device connected thereto (such as the engine 310), and regularly transmits a frame indicating the state (a data frame described below) or the like to a network (that is, the bus 200).

The head unit 100 has a function of receiving frames transmitted from the ECUs 400a to 400d and displaying various states on a display (not illustrated) to present the states to a user. The head unit 100 further has a function of generating a frame indicating each piece of information acquired by the head unit 100 and transmitting the frame to one or more ECUs via the bus 200. The head unit 100 further has a function of determining the conformity of a frame to be transmitted or received with a rule to, for example, identify whether or not the frame is an unauthorized frame (that is, a frame that does not conform to the rule) and performing filtering of the frame, if necessary. The head unit 100 can also have functions such as car navigation, playing music, reproducing moving images, displaying webpages, operating in coordination with a smartphone, and downloading and executing application programs. The head unit 100 is also a kind of ECU.

In the in-vehicle network system 10, the ECUs, including the head unit 100, exchange frames in accordance with the CAN protocol. There are the following frames in the CAN protocol: a data frame, a remote frame, an overload frame, and an error frame. The description will here focus on the data frame and the error frame, for convenience of illustration.

1.2 Data Frame Format

A description will now be given of the data frame, which is a frame used in a network compliant with the CAN protocol.

Figure 2:
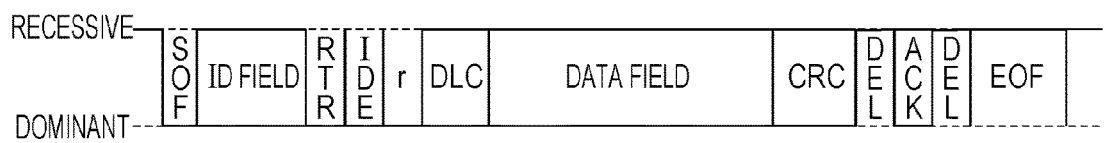
FIG. 2 is a diagram illustrating the format of a data frame specified in the CAN protocol.

FIG. 2 is a diagram illustrating the format of a data frame specified in the CAN protocol. In this figure there is illustrated a data frame in the standard ID format specified in the CAN protocol. The data frame is made up of the following fields: SOF (Start Of Frame), ID field, RTR (Remote Transmission Request), IDE (Identifier Extension), reserved bit "r", DLC (Data Length Code), data field, CRC (Cyclic Redundancy Check) sequence, CRC delimiter "DEL", ACK (Acknowledgement) slot, ACK delimiter "DEL", and EOF (End Of Frame).

The SOF is made up of one dominant bit. The recessive value is set for a state where the bus is idle, and is changed to the dominant value by the SOF to provide notification of the start of frame transmission.

The ID field is a field made up of 11 bits for storing an ID (message ID) that is a value indicating a type of data. The ID field is designed such that a high priority is placed on a frame whose ID has a small value in order to use the ID field to arbitrate communication when a plurality of nodes simultaneously start transmission.

The RTR is a value for identifying a data frame and a remote frame, and is made up of one dominant bit for a data frame.

The IDE and "r" are both made up of one dominant bit.

The DLC is made up of 4 bits, and is a value indicating the length of the data field. The IDE, "r", and the DLC are collectively referred to as a control field.

The data field is a value made up of up to 64 bits, indicating the content of data to be transmitted. The length is adjustable every 8 bits. The specification of data to be sent is not specified in the CAN protocol and is defined in the in-vehicle network system 10. Accordingly, the specification is dependent on the type of vehicle, the manufacturer (producer), and so on.

The CRC sequence is made up of 15 bits. The CRC sequence is calculated by using transmission values of the SOF, the ID field, the control field, and the data field.

The CRC delimiter is a delimiter made up of one recessive bit, indicating the end of the CRC sequence. The CRC sequence and the CRC delimiter are collectively referred to as a CRC field.

The ACK slot is made up of 1 bit. A transmitting node sets the recessive value in the ACK slot when transmitting the frame. A receiving node sets the dominant value in the ACK slot and transmits the frame if the receiving node has been able to correctly receive the frame up to the CRC sequence. Since the dominant value overrides the recessive value, if the ACK slot is constituted by the dominant value after transmission, the transmitting node can confirm that any receiving node has been successful in receiving the frame.

The ACK delimiter is a delimiter made up of one recessive bit, indicating the end of the ACK.

The EOF is made up of 7 bits, and indicates the end of the data frame.

1.3 Error Frame Format

Figure 3:
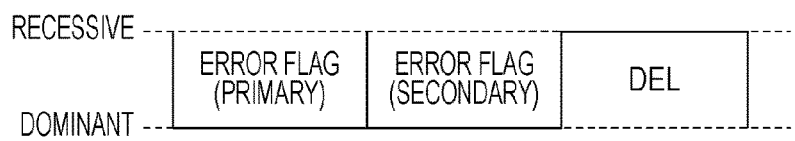
FIG. 3 is a diagram illustrating the format of an error frame specified in the CAN protocol.

FIG. 3 is a diagram illustrating the format of an error frame specified in the CAN protocol. The error frame is constituted by an error flag (primary), an error flag (secondary), and an error delimiter.

The error flag (primary) is used to inform any other node of the occurrence of an error, A node that has detected an error transmits 6 consecutive dominant bits in order to inform any other node of the occurrence of the error. This transmission violates a bit-stuffing rule (in which the same value should not be transmitted over 6 or more consecutive bits) in the CAN protocol, and induces the transmission of an error frame (secondary) from any other node.

The error flag (secondary) is made up of 6 consecutive dominant bits, which is used to inform any other node of the occurrence of an error. All the nodes that have received the error flag (primary) and detected the violation of the bit-stuffing rule transmit an error flag (secondary).

The error delimiter "DEL" is made up of 8 consecutive recessive bits, and indicates the end of the error frame.

1.4 Configuration of Head Unit 100

The head unit 100 is a vehicle communication apparatus, and is a kind of ECU disposed on, for example, an instrument panel or the like of an automobile, including a display device such as a liquid crystal display (LCD) for displaying information to be viewed by a driver, an input means for accepting the operation of the driver, and so on.

FIG. 4 is a configuration diagram of the head unit 100. The head unit 100 is configured to include a multimedia control unit 150 (first control unit) and a system control unit 110 (second control unit).

The system control unit 110 and the multimedia control unit 150 are each a chip (microchip) or the like that is a packaged semiconductor integrated circuit, for example, and are configured to be capable of communicating with each other via wired or wireless connection. Communication via wireless connection is performed by transmission of signals using electromagnetic waves, and includes optical communication.

The system control unit 110 mainly takes on control over coordination with other in-vehicle devices (the ECUs 400a to 400d), that is, takes on control of communication via the bus 200. The system control unit 110 is configured to include a frame transceiving unit 111, a received frame interpretation unit 112, a received-ID judgment unit 113, a received-ID list holding unit 114, a frame determination unit 115, a determination rule holding unit 116, a unit-to-unit communication processing unit 117, and a transmit frame generation unit 118. These constituent elements are functional ones, and each of their functions is implemented by elements integrated on a chip, such as a communication circuit, a memory, a processor (microprocessor) that executes a control program stored in the memory, and other circuits.

The frame transceiving unit 111 transmits and receives a frame compliant with the CAN protocol to and from the bus 200. The frame transceiving unit 111 receives a frame from the bus 200 bit-by-bit, and transfers the frame to the received frame interpretation unit 112. Further, the frame transceiving unit 111 transmits the content of a frame reported by the transmit frame generation unit 118 to the bus 200 bit-by-bit.

The received frame interpretation unit 112 receives the values of the frame from the frame transceiving unit 111, and interprets the values so as to map the values into the respective fields in the frame formats specified in the CAN protocol. The received frame interpretation unit 112 transfers a value judged to correspond to the ID field to the received-ID judgment unit 113. In accordance with a determination result reported from the received-ID judgment unit 113, the received frame interpretation unit 112 decides whether to transfer the value in the ID field and the data field that appears after the ID field to the frame determination unit 115 or to abort reception of the frame (that is, abort interpretation of the frame) after the determination result has been received. Further, the received frame interpretation unit 112 notifies the transmit frame generation unit 118 of a request to transmit an error frame if the frame is judged not to comply with the CAN protocol, for example, if the values of the CRC do not match or if an item whose value should be fixed to the dominant value has the recessive value. Further, when an error frame is received, that is, when an error frame is interpreted to have started from a value in the received frame, the received frame interpretation unit 112 discards the subsequent part of the frame, that is, aborts interpretation of the frame. For example, in a case where an error frame is interpreted to have started in the middle of the data frame, the interpretation of the data frame is aborted and a particular process is not performed according to the data frame.

The received-ID judgment unit 113 receives the value in the ID field reported from the received frame interpretation unit 112, and determines whether or not to receive the respective fields of the frame after the ID field, in accordance with a list of message IDs held in the received-ID list holding unit 114. The received-ID judgment unit 113 notifies the received frame interpretation unit 112 of the determination result.

The received-ID list holding unit 114 holds a received-ID list that is a list of IDs (message IDs) which the head unit 100 receives. FIG. 5 illustrates an example of the received-ID list.

The frame determination unit 115 receives the values of the frame received from the received frame interpretation unit 112 or receives from the unit-to-unit communication processing unit 117 values that are the content of a frame to be transmitted. Further, the frame determination unit 115 acquires a determination rule from the determination rule holding unit 116, and decides whether or not to notify the transmit frame generation unit 118 or the unit-to-unit communication processing unit 117 of the values of the frame in accordance with the result of a frame determination process (system-control-unit frame determination process) based on the determination rule. This frame determination process (system-control-unit frame determination process) is a process for determining the conformity of a frame with the determination rule (such as determining whether or not the frame is unauthorized), and will be described in detail below with reference to FIG. 15.

The determination rule holding unit 116 holds a determination rule to be used to perform a frame determination process on a frame which the head unit 100 transmits or receives. The determination rule is a rule with which frames to be exchanged over the bus 200 in the in-vehicle network system 10 are to comply. FIG. 6 illustrates an example of the determination rule.

The unit-to-unit communication processing unit 117 performs a communication process between different units. Specifically, the unit-to-unit communication processing unit 117 exchanges information with the multimedia control unit 150 via wired or wireless communication (transmission or reception).

In accordance with a notification of instructions from the received frame interpretation unit 112 to transmit an error frame, the transmit frame generation unit 118 forms an error frame and notifies the frame transceiving unit 111 of the error frame for transmission. Further, the transmit frame generation unit 118 generates a data frame to be transmitted by using the ID, data, etc. reported from the frame determination unit 115.

The multimedia control unit 150 mainly takes on the process of executing and controlling an application program for implementing various functions (for example, functions such as car navigation, playing music, reproducing moving images, displaying webpages, and operating in coordination with a smartphone) on the head unit 100. The multimedia control unit 150 is configured to include a unit-to-unit communication processing unit 151, a frame determination unit 152, a determination rule holding unit 153, and an application execution unit 154. These constituent elements are functional ones, and each of their functions is implemented by elements integrated on a chip, such as a communication circuit, a memory a processor that executes a control program stored in the memory, and other circuits.

The unit-to-unit communication processing unit 151 performs a communication process between different units. Specifically, the unit-to-unit communication processing unit 151 exchanges information with the system control unit 110 via wired or wireless communication (transmission or reception).

The frame determination unit 152 receives from the application execution unit 154 values that are the content of a frame to be transmitted or receives the values of the frame received from the unit-to-unit communication processing unit 151. Further, the frame determination unit 152 acquires a determination rule from the determination rule holding unit 153, and decides whether or not to notify the application execution unit 154 or the unit-to-unit communication processing unit 151 of the values of the frame in accordance with the result of a frame determination process (multimedia-control-unit frame determination process) based on the determination rule. This frame determination process (multimedia-control-unit frame determination process) is a process for determining the conformity of a frame with the determination rule (such as determining whether or not the frame is unauthorized), and will be described in detail below with reference to FIG. 16.

The determination rule holding unit 153 holds a determination rule to be used to perform a frame determination process on a frame which the head unit 100 transmits or receives. The determination rule is a rule with which frames to be exchanged over the bus 200 in the in-vehicle network system 10 are to comply. Note that the determination rule held in the determination rule holding unit 153 of the multimedia control unit 150 and the determination rule held in the determination rule holding unit 116 of the system control unit 110 may be the same or different so long as it is sufficient that each determination rule include at least information, such as criteria and conditions, necessary for the determination performed in the corresponding one of the frame determination unit 152 and the frame determination unit 115.

The application execution unit 154 executes and controls an application program for implementing various functions (for example, functions such as navigation, reproducing moving images, playing music, and web browsing) of the head unit 100. For example, the application program is executed and controlled in accordance with an operation of the driver (user) which is accepted through an input means, and the application program is executed and controlled to allow, for example, information which is to be presented to the user to be displayed on the display device. The application program is downloaded via, for example, an external network other than the bus 200 and is executed on an execution environment such as a predetermined operating system (OS) operating on a processor of the multimedia control unit 150 by the processor to perform operation.

1.5 Example Received-ID List in Head Unit 100

FIG. 5 is a diagram illustrating an example of the received-ID list held in the received-ID list holding unit 114 of the head unit 100. The received-ID list illustrated by way of example in FIG. 5 is used to selectively receive and process a frame including a message ID whose ID (message ID) value is any of "1", "2", "3", and "4". The head unit 100 receives a frame (message) whose message ID is "1" from the ECU 400a connected to the engine 310, a frame whose message ID is "2" from the ECU 400b connected to the brakes 320, a frame whose message ID is "3" from the ECU 400c connected to the door open/close sensor 330, and a frame whose message ID is "4" from the ECU 400d connected to the window open/close sensor 340.

1.6 Example Determination Rule

FIG. 6 is a diagram illustrating an example of the determination rule held in the determination rule holding unit 116 and the determination rule holding unit 153 of the head unit 100. The determination rule illustrated by way of example in FIG. 6 indicates, for each ID (message ID), a rule (criterion) with which a message (frame) having the message ID is to comply. The determination rule includes, for each message ID, the following items: a transmission/reception type, a data length, a data range, a period (ms), a margin (ms), the presence or absence of an event, and a threshold frequency-of-occurrence value (the number of occurrences/sec).

In the example in FIG. 6, the transmission/reception type represents the value 1 for a received frame that is a frame transmitted from any other ECU and acquired by the head unit 100 via the bus 200, and represents the value 0 for a transmit frame that is a frame for transmission from the head unit 100 to the bus 200 to discriminate them.

The data length represents a criterion for the length (the number of bytes) of a data field included in a frame (data frame).

The data range represents a criterion for the range of values that the data can take byte-by-byte for bytes 1 to 8 of the data field. As a range of values that the data can take, the sign "**" in FIG. 6 indicates that any value can be taken. Further, values connected by the sign "," indicate that either value can be taken, and values connected by "-" (hyphen) indicate that any value within a range of the respective values as the upper and lower limits can be taken.

The period represents a criterion for the period in which a frame is transmitted or received when the frame is repeatedly transmitted or received. In FIG. 6, the period is represented by a value expressed in milliseconds. In FIG. 6, the sign "-" as a period indicates that there is no frame to be periodically transmitted or received as a frame having the corresponding message ID.

The margin represents a deviation from a period allowed for the determination of the conformity with the criterion for the period (allowable range of error). In FIG. 6, the margin is represented by a value expressed in milliseconds.

The presence or absence of an event represents a criterion for whether or not an event frame to be transmitted or received separately from the period is likely to be present as a frame having the corresponding message ID. In FIG. 6, the value 1 indicates that such an event frame is likely to be present, and the value 0 indicates that such an event frame is absent.

The threshold frequency-of-occurrence value represents a criterion for how frequently a frame is transmitted or received when an event frame to be transmitted or received is likely to be present as a frame having the corresponding message ID. In FIG. 6, the threshold frequency-of-occurrence value is represented by the number of transmissions or receptions per second.

The example illustrated in FIG. 6 is merely an example of the determination rule, and the determination rule may have any content so long as the determination rule includes criteria and the like defined as requirements of a frame. In FIG. 6, for example, rules (criteria) for data ranges are expressed in bytes. However, the rules may not necessarily be expressed in bytes. In addition, the rule categories (criteria) for a transmit frame may not necessary match the rule categories (criteria) for a received frame. The determination rule may be expressed in table form or may be expressed by mathematical expression, program (command sequence), or the like.

1.7 Configuration of ECU 400a

Figures 7, 8:
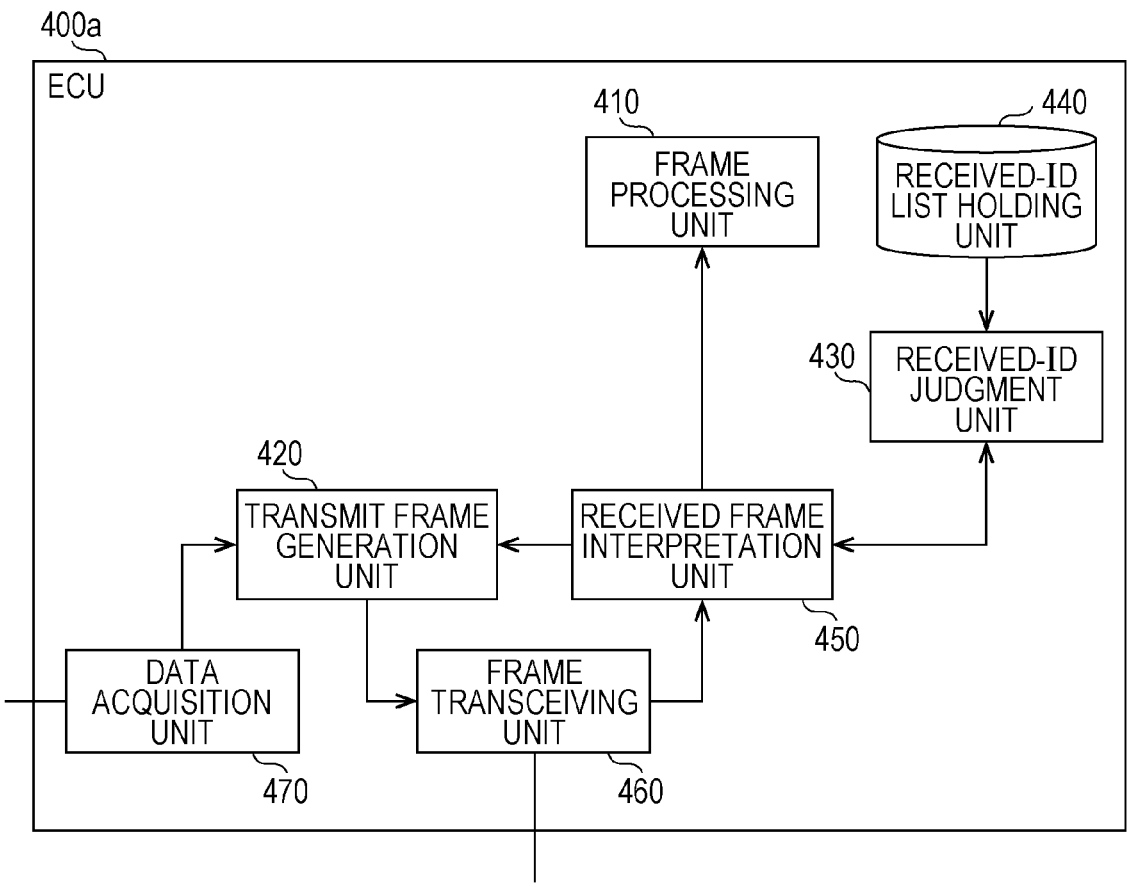
FIG. 7 is a configuration diagram of an ECU.
FIG. 8 is a diagram illustrating an example of a received-ID list held in the ECU.

FIG. 7 is a configuration diagram of the ECU 400a. The ECU 400a is configured to include a frame transceiving unit 460, a received frame interpretation unit 450, a received-ID judgment unit 430, a received-ID list holding unit 440, a frame processing unit 410, a transmit frame generation unit 420, and a data acquisition unit 470. These constituent elements are functional ones, and each of their functions is implemented by elements in the ECU 400a, such as a communication circuit, a processor that executes a control program stored in a memory, or a digital circuit.

The frame transceiving unit 460 transmits and receives a frame compliant with the CAN protocol to and from the bus 200. The frame transceiving unit 460 receives a frame from the bus 200 bit-by-bit, and transfers the frame to the received frame interpretation unit 450. Further, the frame transceiving unit 460 transmits the content of a frame reported by the transmit frame generation unit 420 to the bus 200.

The received frame interpretation unit 450 receives the values of the frame from the frame transceiving unit 460, and interprets the values so as to map the values into the respective fields in the frame formats specified in the CAN protocol. The received frame interpretation unit 450 transfers a value judged to correspond to the ID field to the received-ID judgment unit 430. In accordance with a determination result reported from the received-ID judgment unit 430, the received frame interpretation unit 450 decides whether to transfer the value in the ID field and the data field that appears after the ID field to the frame processing unit 410 or to abort reception of the frame (that is, abort interpretation of the frame) after the determination result has been received. Further, the received frame interpretation unit 450 notifies the transmit frame generation unit 420 of a request to transmit an error frame if the frame is judged not to comply with the CAN protocol. Further, when an error frame is received, that is, when an error frame is interpreted to have started from a value in the received frame, the received frame interpretation unit 450 discards the subsequent part of the frame, that is, aborts interpretation of the frame.

The received-ID judgment unit 430 receives the value in the ID field reported from the received frame interpretation unit 450, and determines whether or not to receive the respective fields of the frame after the ID field, in accordance with a list of message IDs held in the received-ID list holding unit 440. The received-ID judgment unit 430 notifies the received frame interpretation unit 450 of the determination result.

The received-ID list holding unit 440 holds a received-ID list that is a list of IDs (message IDs) which the ECU 400a receives. FIG. 8 illustrates an example of the received-ID list.

The frame processing unit 410 performs a process related to a function that is different from ECU to ECU in accordance with the data of the received frame. For example, the ECU 400a connected to the engine 310 has a function of sounding an alarm when a door is open while the vehicle speed is over 30 km per hour. The ECU 400a includes, for example, a speaker or the like for sounding an alarm. The frame processing unit 410 of the ECU 400a manages data (for example, information indicating the state of the doors) received from any other ECU, and performs a process such as sounding an alarm in a certain condition on the basis of the average speed per hour acquired from the engine 310.

The data acquisition unit 470 acquires data indicating the state of the elements connected to the ECU 400a, such as devices and sensors, and notifies the transmit frame generation unit 420 of the data.

In accordance with a notification of instructions to transmit an error frame, which are reported from the received frame interpretation unit 450, the transmit frame generation unit 420 forms an error frame and notifies the frame transceiving unit 460 of the error frame for transmission. Further, the transmit frame generation unit 420 adds a predetermined message ID to the value of the data reported from the data acquisition unit 470 to form a frame, and notifies the frame transceiving unit 460 of the frame.

Each of the ECUs 400b to 400d also has a configuration basically similar to that of the ECU 400a described above. The received-ID list held in the received-ID list holding unit 440 may have content different from ECU to ECU, or may have the same or substantially the same content. Furthermore, the content of the process performed by the frame processing unit 410 differs from ECU to ECU. For example, the content of the process performed by the frame processing unit 410 in the ECU 400c includes a process related to a function of sounding an alarm if a door is opened while the brakes are not applied. For example, the frame processing units 410 in the ECU 400b and the ECU 400d do not perform a special process. Each ECU may have functions other than those described here for illustrative purposes. The content of respective frames transmitted from the ECUs 400a to 400d will be described below with reference to FIGS. 9 to 12.

1.8 Example Received-ID List in ECUs 400a to 400d

FIG. 8 is a diagram illustrating an example of the received-ID list held in each of the ECU 400a, the ECU 400b, the ECU 400c, and the ECU 400d. The received-ID list illustrated by way of example in FIG. 8 is used to selectively receive and process a frame including a message ID whose ID (message ID) value is any of "1", "2", "3", "4", "5", "6", and "7".

1.9 Example Transmit Frame from Engine-Related ECU 400a

FIG. 9 is a diagram illustrating an example of an ID (message ID) and a data field (data) in a frame transmitted from the ECU 400a connected to the engine 310. The ECU 400a transmits a frame whose message ID is "1". The data represents the average speed per hour (km/h), taking a value in the range from a minimum speed of 0 (km/h) to a maximum speed of 180 (km/h), and has a length of 1 byte. FIG. 9 illustrates, from top to bottom, message IDs and data corresponding to frames transmitted sequentially from the ECU 400a, by way of example, and depicts acceleration, increasing the speed from 0 km/h in increments of 1 km/h.

1.10 Example Transmit Frame from Brake-Related ECU 400b

FIG. 10 is a diagram illustrating an example of an ID (message ID) and a data field (data) in a frame transmitted from the ECU 400b connected to the brakes 320. The ECU 400b transmits a frame whose message ID is "2". The data represents the degree to which the brakes are applied, expressed as a percentage (%), and has a length of 1 byte. A percentage of 0 (%) indicates a state where the brakes are not applied at all and 100 (%) indicates a state where the brakes are maximally applied. FIG. 10 illustrates, from top to bottom, message Ds and data corresponding to frames transmitted sequentially from the ECU 400b, by way of example, and depicts a gradual easing off of the brakes from 100%.

1.11 Example Transmit Frame from Door-Open/Close-Sensor-Related ECU 400c

FIG. 11 is a diagram illustrating an example of an ID (message ID) and a data field (data) in a frame transmitted from the ECU 400c connected to the door open/close sensor 330. The ECU 400c transmits a frame whose message ID is "3". The data represents the open or closed state for the door, and has a length of 1 byte. The data has the value "1" for a door-open state and the value "0" for a door-closed state.

FIG. 11 illustrates, from top to bottom, message IDs and data corresponding to frames transmitted sequentially from the ECU 400c, by way of example, and depicts a gradual transition from the door-open state to the closed state.

1.12 Example Transmit Frame from Window-Open/Close-Sensor-Related ECU 400d

FIG. 12 is a diagram illustrating an example of an ID (message ID) and a data field (data) in a frame transmitted from the ECU 400d connected to the window open/close sensor 340. The ECU 400d transmits a frame whose message ID is "4". The data represents the open or closed state for the window, expressed as a percentage (%), and has a length of 1 byte. A percentage of 0 (%) indicates a state where the window is completely closed and 100 (%) indicates a state where the window is completely open. FIG. 12 illustrates, from top to bottom, message IDs and data corresponding to frames transmitted sequentially from the ECU 400d, by way of example, and depicts a gradual transition from the window-closed state to the open state.

1.13 Frame Reception Operation Performed by Head Unit 100

Figure 13:
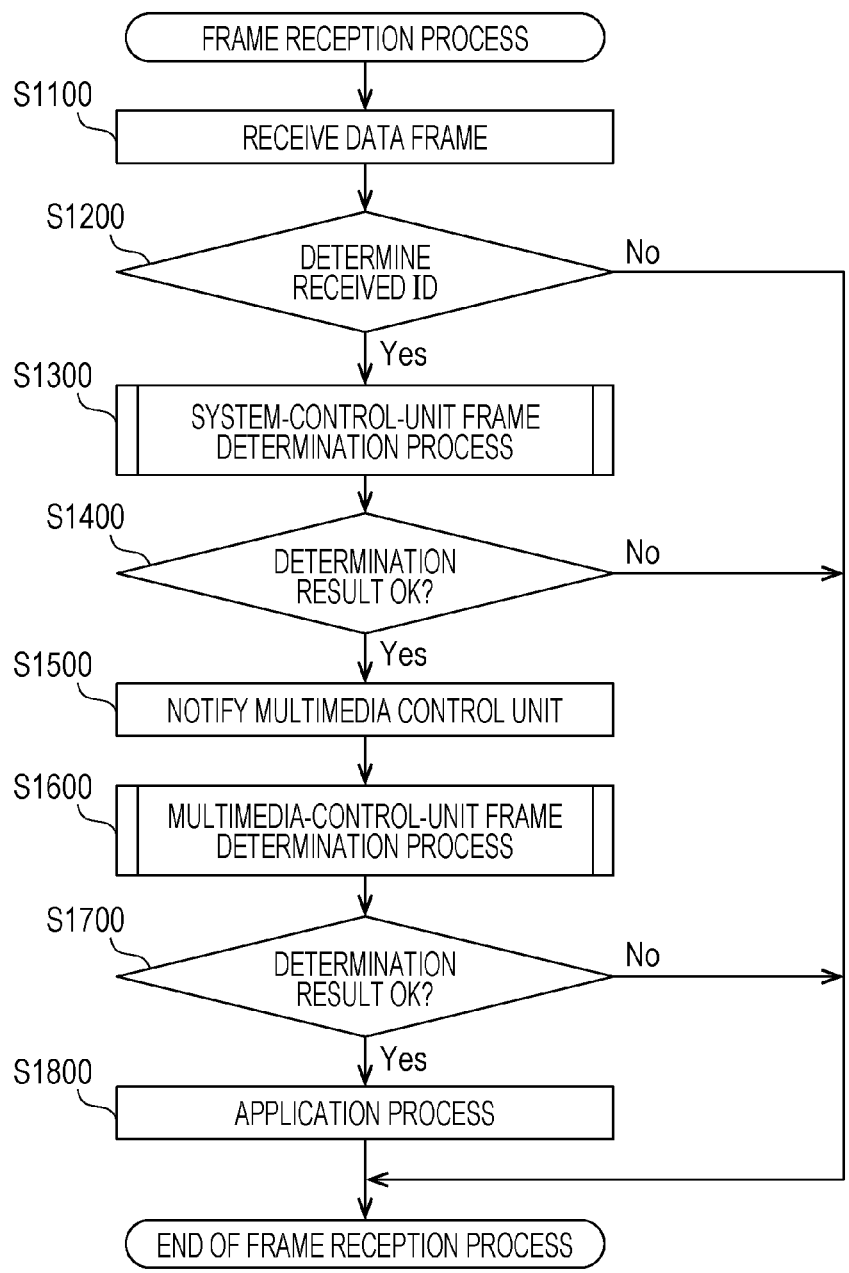
FIG. 13 is a flowchart illustrating an example of a frame reception process performed in the head unit according to the first embodiment.

FIG. 13 is a flowchart illustrating an example of a frame reception process performed in the head unit 100. The operation performed by the head unit 100 when a data frame is received will now be described in accordance with FIG. 13.

The head unit 100 receives a frame appearing on the bus 200 by using the frame transceiving unit 111 of the system control unit 110 (step S1100).

When the frame transceiving unit 111 receives the ID portion of the frame, the received frame interpretation unit 112 and the received-ID judgment unit 113 refer to the received-ID list held in the received-ID list holding unit 114 to identify whether or not the frame is a frame including an ID to be received, thereby determining whether or not to receive the subsequent part of the frame (step S1200). If the received frame includes an ID not contained in the received-ID list, the frame reception process ends.

If the ID of the received frame is included in the received-ID list in step S1200, the frame is received and the frame determination unit 115 performs a system-control-unit frame determination process (step S1300). The system-control-unit frame determination process S1300 will be described below with reference to FIG. 15.

If the determination result of the system-control-unit frame determination process is OK (normal) (that is, if it is determined that the received frame conforms to the determination rule) (step S1400), the system control unit 110 notifies the multimedia control unit 150 of the content of the frame (received frame) by using a unit-to-unit communication process (step S1500). If the determination result of the system-control-unit frame determination process is not OK in step S1400, the system control unit 110 does not notify the multimedia control unit 150 of the frame, and then ends the frame reception process.

Then, in the multimedia control unit 150, when the notification of the received frame is received, the frame determination unit 152 performs a multimedia-control-unit frame determination process (step S1600). The multimedia-control-unit frame determination process S1600 will be described below with reference to FIG. 16.

In the multimedia-control-unit frame determination process, if the determination result is OK (that is, if it is determined that the received frame conforms to the determination rule) (step S1700), the frame determination unit 152 notifies the application execution unit 154 of the content of the received frame. Then, the application execution unit 154 executes an application program for implementing the various functions of the head unit 100 to perform a process corresponding to the content of the received frame (step S1800). Examples of the process corresponding to the content of the received frame (received-frame-based process) include computation based on the content of the data field in the received frame, and the output of a control signal based on the result of the computation (for example, the output of a control signal to display information on the display device). If the determination result of the multimedia-control-unit frame determination process is not OK in step S1700, the multimedia control unit 150 does not perform a process corresponding to the content of the received frame in accordance with the application program.

1.14 Frame Transmission Operation Performed by Head Unit 100

Figure 14:
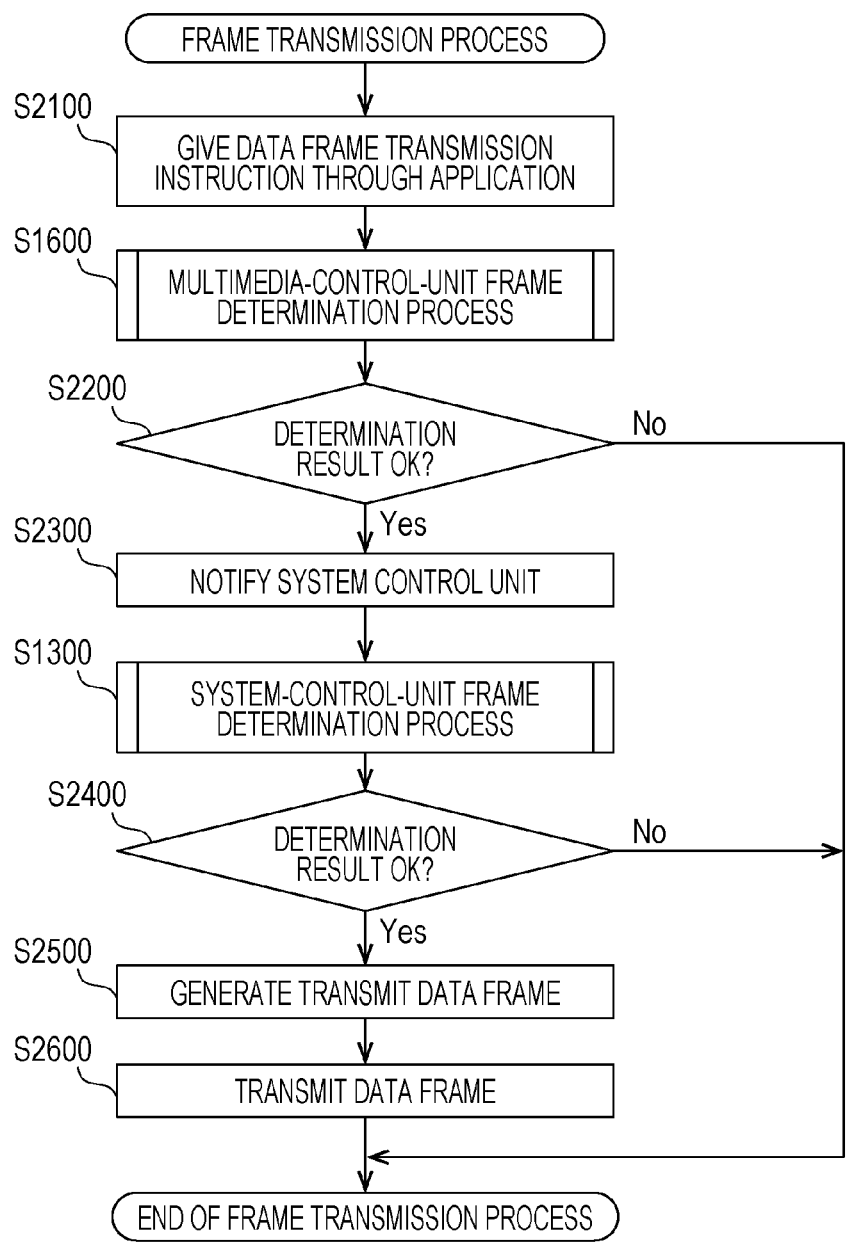
FIG. 14 is a flowchart illustrating an example of a frame transmission process performed in the head unit according to the first embodiment.

FIG. 14 is a flowchart illustrating an example of a frame transmission process performed in the head unit 100. The operation performed by the head unit 100 for transmitting a data frame will now be described in accordance with FIG. 14. It is assumed here that the application program executed by the application execution unit 154 includes content (command sequence) for providing a transmission instruction by specifying the content (for example, the ID and the content of the data field) of a frame (transmit frame) to be transmitted at constant intervals or when necessary for implementing the function.

The application execution unit 154 executes the application program, and an instruction is given to transmit a data frame in accordance with the application program (step S2100).

When a transmission instruction is provided by specifying the content of the transmit frame, the frame determination unit 152 performs a multimedia-control-unit frame determination process upon receipt of the notification of the specified content of the transmit frame from the application execution unit 154 (step S1600). In the illustrated example, it is assumed that a multimedia-control-unit frame determination process S1600, which is the same or substantially the same as the frame reception process described above (FIG. 13), is performed in the frame transmission process.

In the multimedia-control-unit frame determination process, if the determination result is OK (that is, if it is determined that the transmit frame conforms to the determination rule) (step S2200), the multimedia control unit 150 notifies the system control unit 110 of the content of the frame (transmit frame) by using a unit-to-unit communication process (step S2300). If the determination result of the multimedia-control-unit frame determination process is not OK in step S2200, the multimedia control unit 150 does not notify the system control unit 110 of the content of the transmit frame, and then ends the frame transmission process.

Then, in the system control unit 110, when the notification of the content of the transmit frame is received, the frame determination unit 115 performs a system-control-unit frame determination process (step S1300). In the illustrated example, it is assumed that a system-control-unit frame determination process S1300, which is the same or substantially the same as the frame reception process described above (FIG. 13), is performed in the frame transmission process.

In the system-control-unit frame determination process, if the determination result is OK (that is, if it is determined that the transmit frame conforms to the determination rule) (step S2400), the transmit frame generation unit 118 generates a transmit frame (data frame) on the basis of the content of the transmit frame (the content designated by the multimedia control unit 150 in accordance with the application program) (step S2500). Then, the frame transceiving unit 111 delivers the transmit frame generated by the transmit frame generation unit 118 to the bus 200 to transmit a data frame (step S2600). If the determination result of the system-control-unit frame determination process is not OK in step S2400, the system control unit 110 does not deliver the transmit frame to the bus 200. That is, if the transmit frame conforms to the rule, the head unit 100 delivers the transmit frame to the bus 200, whereas if the transmit frame does not conform to the rule (if nonconformity exists), the transmit frame is prevented from being delivered to the bus 200.

1.15 System-Control-Unit Frame Determination Process

Figure 15:
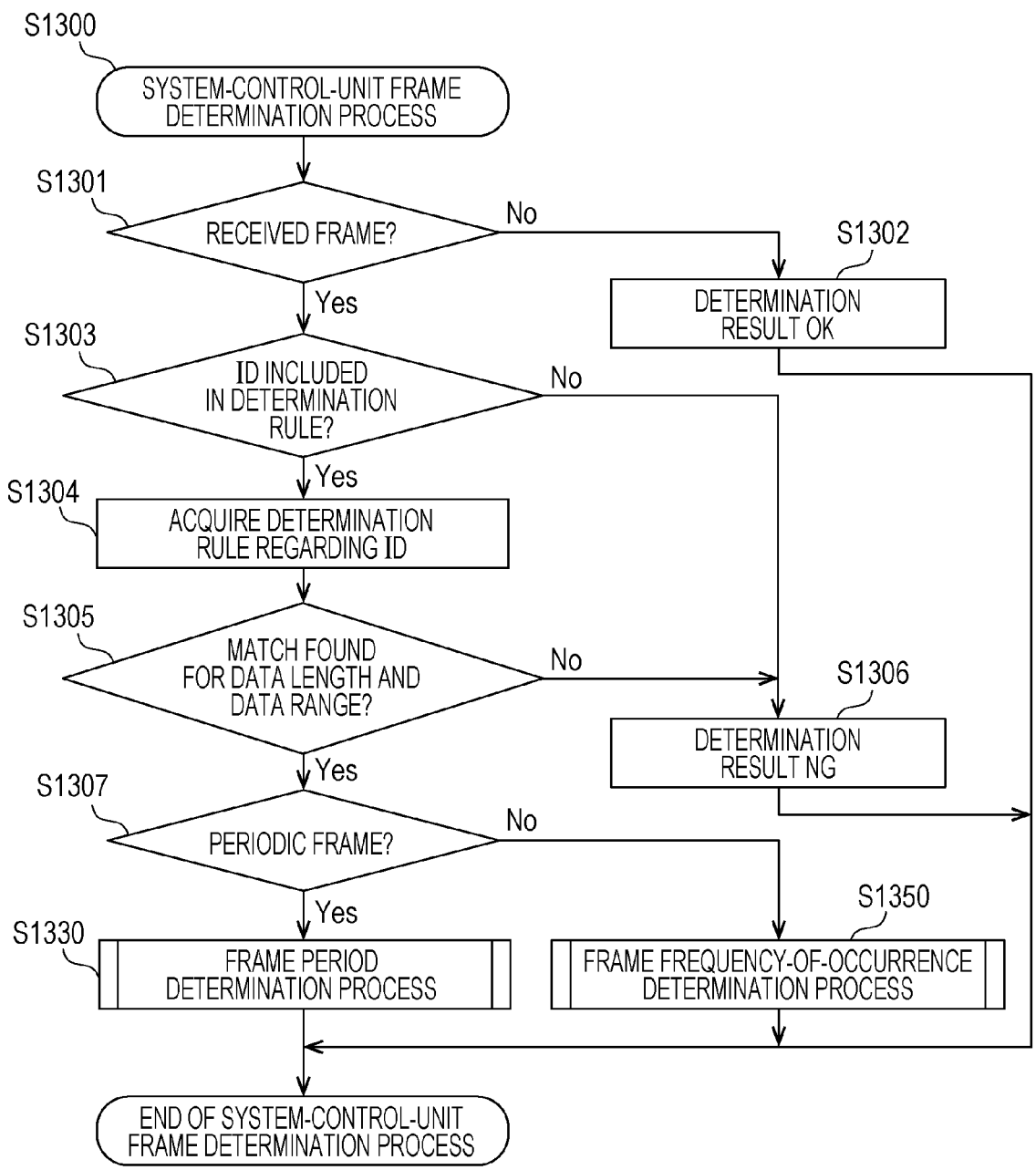
FIG. 15 is a flowchart illustrating an example of a frame determination process performed in a system control unit according to the first embodiment.

FIG. 15 is a flowchart illustrating an example of the frame determination process (system-control-unit frame determination process) performed in the system control unit 110. The system-control-unit frame determination process S1300, which is performed by the frame determination unit 115 of the system control unit 110, will now be described in accordance with FIG. 15. In the system-control-unit frame determination process S1300, the determination rule (see FIG. 6) held in the determination rule holding unit 116 is referenced to determine the conformity of a frame with the determination rule. If the frame conforms to the determination rule, the determination result is regarded as OK (normal), whereas, if the frame does not conform to the determination rule, the determination result is regarded as NG (unauthorized). It is assumed here that the determination rule includes the ID of each frame that the head unit 100 transmits or receives.

The frame determination unit 115 identifies whether the target to be determined is a transmit frame or a received frame (step S1301). If the target to be determined is a transmit frame, the frame determination unit 115 regards the determination result as OK, and then ends the system-control-unit frame determination process (step S1302). If the target to be determined is a received frame, the process proceeds to step S1303. Upon being notified of data (a received frame) by the received frame interpretation unit 112, the frame determination unit 115 identifies the target to be determined as a received frame. Upon being notified of data (the content of a transmit frame) by the unit-to-unit communication processing unit 117, the frame determination unit 115 identifies the target to be determined as a transmit frame.

In step S1303, the frame determination unit 115 checks whether or not an ID that matches the ID of the frame to be determined is included in the determination rule (step S1303). If the ID is included, the frame determination unit 115 acquires the individual categories in the determination rule regarding the ID (step S1304). If an ID that matches the ID of the frame to be determined is not included in the determination rule, the frame determination unit 115 regards the determination result as NG (step S1306), and then ends the system-control-unit frame determination process.

The frame determination unit 115 determines whether or not the frame to be determined conforms to the criteria for the categories, namely, the data length and the data range, in the determination rule, which are acquired in step S1304 (step S1305). If the frame to be determined does not conform to one of the criterion for the data length and the criterion for the data range, the frame determination unit 115 regards the determination result as NG (step S1306), and then ends the system-control-unit frame determination process.

If it is determined in step S1305 that the frame to be determined conforms to both the criterion for the data length and the criterion for the data range, the frame determination unit 115 identifies whether or not the frame to be determined is a periodically transmitted or received frame (step S1307). Specifically, a frame for which the category for the period in the determination rule does not indicate the absence of a periodically transmitted or received frame and for which the category for the presence or absence of an event indicates the absence of an event frame is identified as a periodically transmitted or received frame, and a frame otherwise is identified as not being a periodically transmitted or received frame. If the frame to be determined is identified as a periodically transmitted or received frame, the frame determination unit 115 performs a frame period determination process (step S1330). If the frame to be determined is identified as not being a periodically transmitted or received frame, the frame determination unit 115 performs a frame frequency-of-occurrence determination process (step S1350). The frame period determination process S1330 and the frame frequency-of-occurrence determination process S1350 will be described below.

1.16 Multimedia-Control-Unit Frame Determination Process

Figure 16:
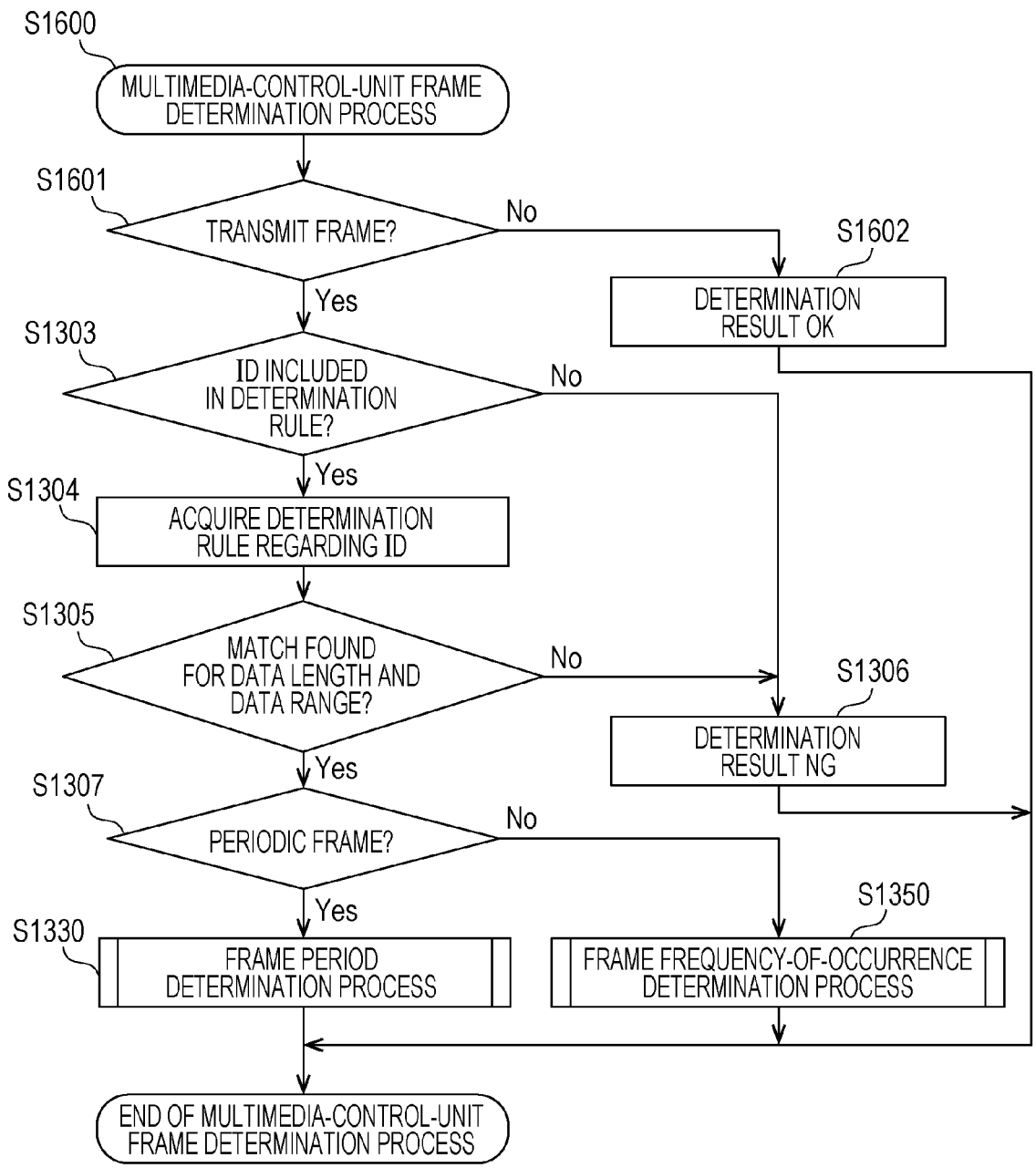
FIG. 16 is a flowchart illustrating an example of a frame determination process performed in a multimedia control unit according to the first embodiment.

FIG. 16 is a flowchart illustrating an example of the frame determination process (multimedia-control-unit frame determination process) performed in the multimedia control unit 150. The multimedia-control-unit frame determination process S1600 performed by the frame determination unit 152 of the multimedia control unit 150 will now be described in accordance with FIG. 16. In the multimedia-control-unit frame determination process S1600, the determination rule (see FIG. 6) held in the determination rule holding unit 153 is referenced to determine the conformity of a frame with the determination rule. If the frame conforms to the determination rule, the determination result is regarded as OK (normal), whereas, if the frame does not conform to the determination rule, the determination result is regarded as NG (unauthorized).

The frame determination unit 152 identifies whether the target to be determined is a transmit frame or a received frame (step S1601). If the target to be determined is a received frame, the frame determination unit 152 regards the determination result as OK, and then ends the multimedia-control-unit frame determination process (step S1602). If the target to be determined is a transmit frame, the process proceeds to step S1303, Upon being notified of data (a received frame) by the unit-to-unit communication processing unit 151, the frame determination unit 152 identifies the target to be determined as a received frame. Upon being notified of data (the content of a transmit frame) by the application execution unit 154, the frame determination unit 152 identifies the target to be determined as a transmit frame.

In the multimedia-control-unit frame determination process S1600, steps S1303, S1304, S1305, S1306, S1307, S1330, and S1350 have the same or substantially the same content as those in the system-control-unit frame determination process S1300 (FIG. 15) described above, and are not described herein.

1.17 Frame Period Determination Process

Figure 17:
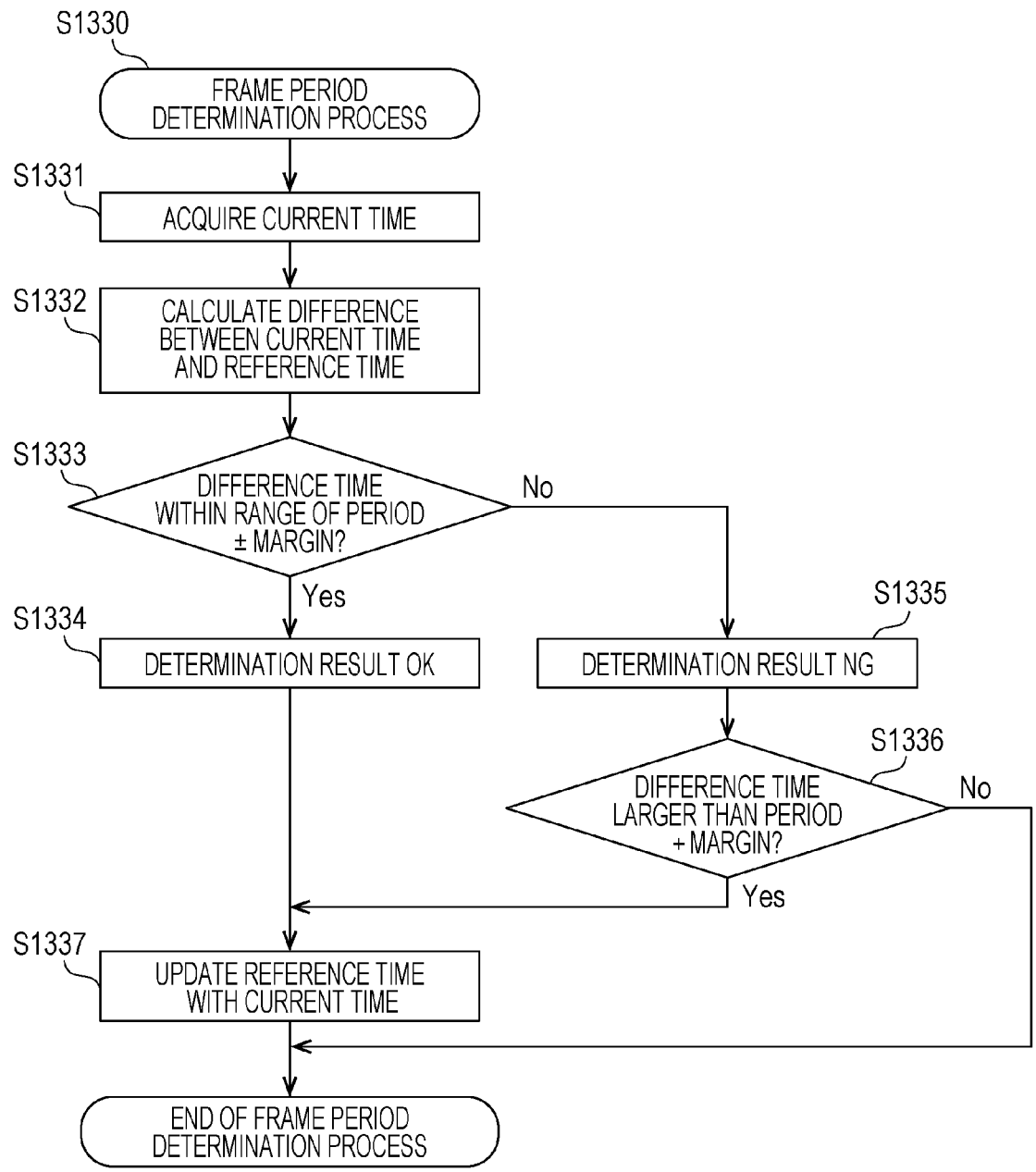
FIG. 17 is a flowchart illustrating an example of a frame period determination process according to the first embodiment.

FIG. 17 is a flowchart illustrating an example of the frame period determination process S1330. The frame determination unit (namely, the frame determination unit 115 or the frame determination unit 152) executes the frame period determination process S1330. The frame period determination process S1330 is a process for determining whether or not the frame to be determined conforms to the criterion for periodicity, that is, whether or not the frame is being transmitted or received in a correct period.

In the frame period determination process S1330, first, the frame determination unit acquires the current time (step S1331). For example, the frame determination unit 115 acquires the current time by using a time counting mechanism (such as a timer) in the system control unit 110, and the frame determination unit 152 acquires the current time by using a time counting mechanism (such as a timer) in the multimedia control unit 160. Alternatively, each frame determination unit may acquire the current time from a time counting mechanism (such as a timer) that is a circuit separate from the system control unit 110 and the multimedia control unit 150 in the head unit 100.

Then, the frame determination unit calculates a difference between the acquired current time and a saved reference time (step S1332). When the frame period determination process S1330 is executed for the first time, there is no saved reference time. Thus, as an exception, the determination result is regarded as OK, for example, and the current time is saved as a reference time.

Subsequently to step S1332, the frame determination unit identifies whether or not the difference (referred to as difference time) between the current time and the reference time falls within the range of period±margin (step S1333). This identification is performed by using the period and margin, corresponding to the ID of the frame to be determined by the frame determination unit, in the determination rule (see FIG. 6).

If the difference time is identified in step S1333 as being within the range of period±margin, the frame determination unit regards the determination result as OK (normal) (step S1334), and updates the reference time by using the current time acquired in step S1331 (step S1337). Then, the frame period determination process S1330 ends.

If the difference time is identified in step S1333 as not being within the range of period±margin, the frame determination unit regards the determination result as NG (unauthorized) (step S1335), and identifies whether or not the difference time is larger than the value given by period+margin (step S1336). If the difference time is identified in step S1336 as not being larger than the value given by period+margin, the frame determination unit ends the frame period determination process S1330. If the difference time is identified as being larger than the value given by period+margin, the frame determination unit updates the reference time by using the current time acquired in step S1331 (step S1337), and then ends the frame period determination process S1330.

1.18 Frame Frequency-of-Occurrence Determination Process

Figure 18:
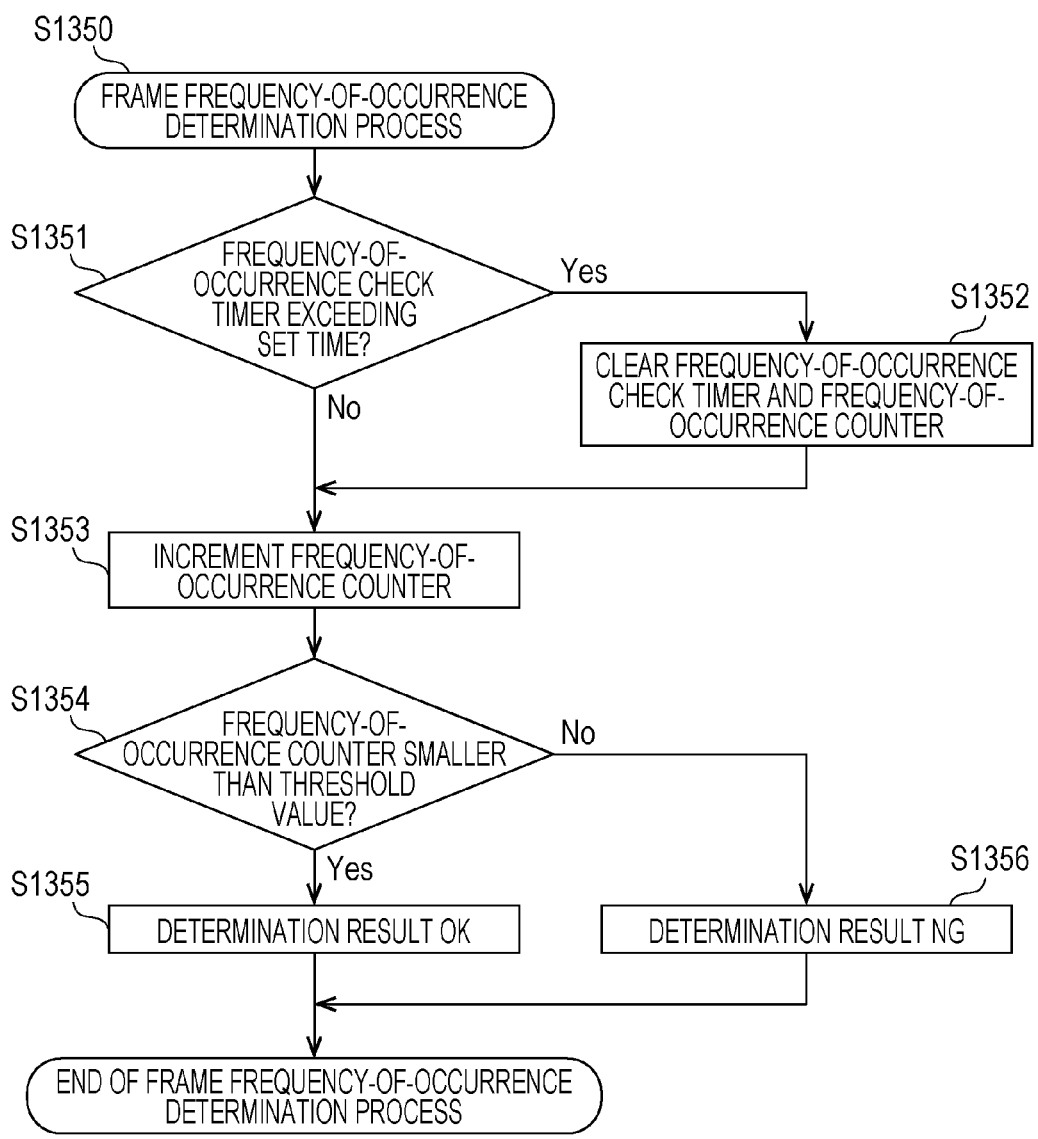
FIG. 18 is a flowchart illustrating an example of a frame frequency-of-occurrence determination process.

FIG. 18 is a flowchart illustrating an example of the frame frequency-of-occurrence determination process S1350. The frame determination unit (namely, the frame determination unit 115 or the frame determination unit 152) executes the frame frequency-of-occurrence determination process S1350. The frame frequency-of-occurrence determination process S1350 is a process for determining whether or not the frame to be determined conforms to the criterion for the frequency of occurrence, that is, whether or not the frame is being transmitted or received with a correct frequency (with a frequency less than the threshold frequency-of-occurrence value).

In the frame frequency-of-occurrence determination process S1350, first, the frame determination unit identifies whether or not a frequency-of-occurrence check timer exceeds a set time (which is set here to one second) (step S1351). For example, the frame determination unit 115 causes a time counting mechanism (such as a timer) in the system control unit 110 to function as a frequency-of-occurrence check timer, and the frame determination unit 152 causes a time counting mechanism (such as a timer) in the multimedia control unit 150 to function as a frequency-of-occurrence check timer. Alternatively, each frame determination unit may implement the function of the frequency-of-occurrence check timer by using a time counting mechanism (such as a timer) that is a circuit separate from the system control unit 110 and the multimedia control unit 150 in the head unit 100.

Then, the frame determination unit clears (resets) the frequency-of-occurrence check timer when the frequency-of-occurrence check timer exceeds the set time, and clears a frequency-of-occurrence counter serving as a variable for counting the frequency of occurrence (step S1352).

If the frequency-of-occurrence check timer does not exceed the set time in step S1351 and when the frequency-of-occurrence check timer is reset in step S1352, the frame determination unit increments (increases by 1) the frequency-of-occurrence counter (step S1353). Then, the frame determination unit identifies whether or not the frequency-of-occurrence counter is smaller than the threshold frequency-of-occurrence value, corresponding to the ID of the frame to be determined by the frame determination unit, in the determination rule (see FIG. 6) (step S1354).

If the frequency-of-occurrence counter is identified in step S1354 as being smaller than the threshold frequency-of-occurrence value, the frame determination unit regards the determination result as OK (normal) (step S1355), and then ends the frame frequency-of-occurrence determination process S1350.

If the frequency-of-occurrence counter is identified in step S1354 as not being smaller than the threshold frequency-of-occurrence value, the frame determination unit regards the determination result as NG (unauthorized) (step S1356), and then ends the frame frequency-of-occurrence determination process S1350.

1.19 Advantageous Effects of First Embodiment

In the in-vehicle network system 10 according to the first embodiment, whether or not a frame conforms to a specified rule is determined by using a plurality of rule categories (criteria) such as how frequently a frame is transmitted or received or the period in which a frame is transmitted or received, and the subsequent processing is filtered (prevented from taking place) if the frame does not conform to the specified rule. This reduces the delivery of an unauthorized frame to the bus 200 according to an unauthorized application program. In addition, the respective frame determination units of the system control unit 110, which is a chip that mainly takes charge of communication using the bus 200, and the multimedia control unit 150, which is a chip that mainly takes charge of operations such as executing and controlling an application program, share the determination for a transmit frame and a received frame to determine whether or not the frames conform to rules. This prevents a frame that does not conform to a rule from being transmitted between the chips, thereby reducing the processing load.

1.20 First Modification of First Embodiment

There will now be described a frame period determination process S3330, which is obtained by partially modifying the frame period determination process S1330 (see FIG. 17) described above.

Figure 19:
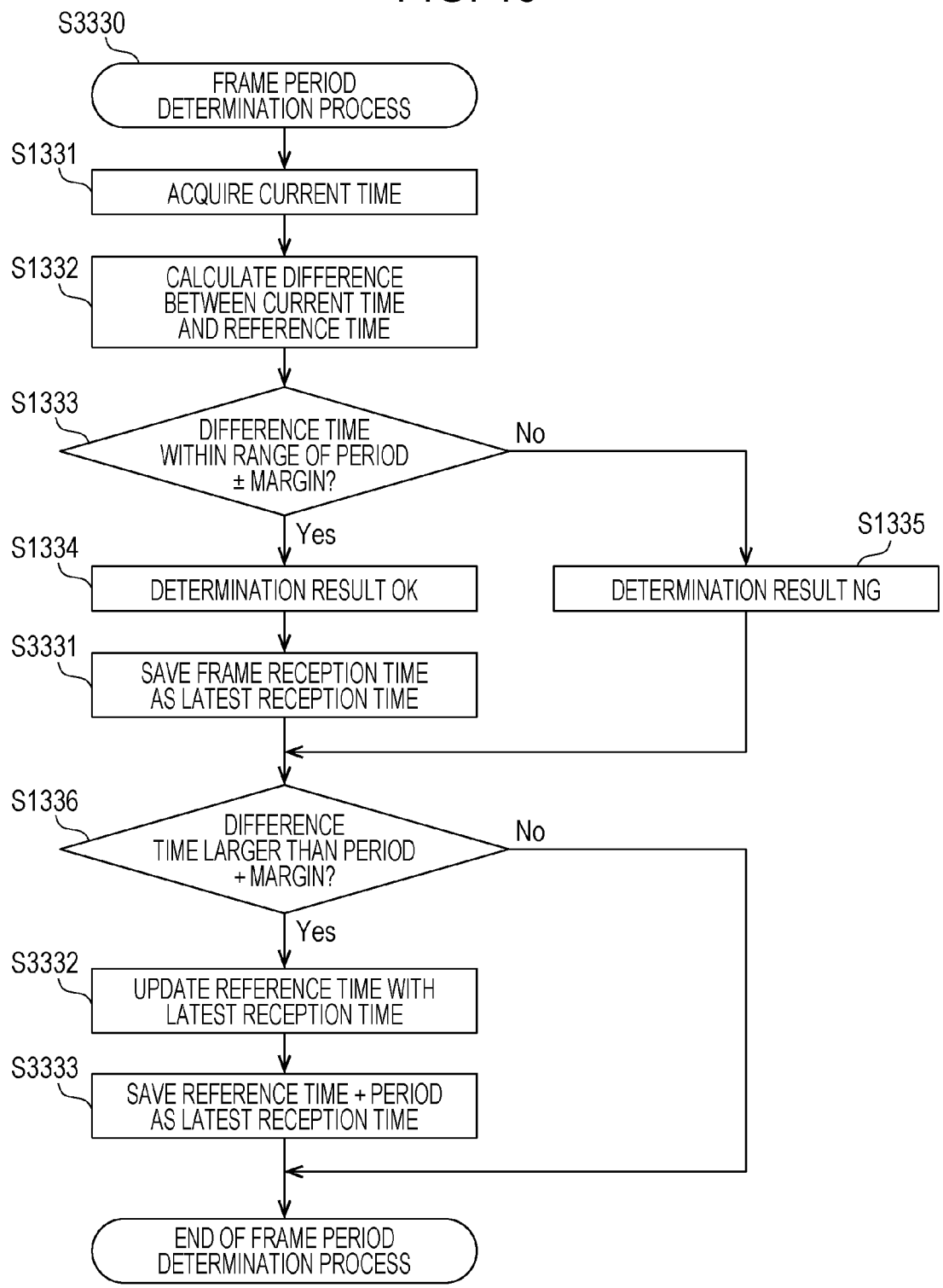
FIG. 19 is a flowchart illustrating a frame period determination process according to a first modification of the first embodiment.

FIG. 19 illustrates a flowchart of the frame period determination process S3330. The frame determination unit (namely, the frame determination unit 115 or the frame determination unit 152) executes the frame period determination process S3330 instead of the frame period determination process S1330 described above.

In the frame period determination process S3330, steps S1331 to S1336 have the same or substantially the same content as those in the frame period determination process S1330 (FIG. 17) described above and are not described, as appropriate.

If the difference time is identified in step S1333 as being within the range of period±margin, the frame determination unit regards the determination result as OK (normal) (step S1334), and saves, as the latest reception time, the time at which the frame to be determined was received (step S3331).

After step S1335 or step S3331, the frame determination unit identifies whether or not the difference time is larger than a value given by period+margin (step S1336). If the difference time is identified in step S1336 as not being larger than the value given by period+margin, the frame determination unit ends the frame period determination process S3330. If the difference time is identified as being larger than the value given by period+margin, the frame determination unit updates the reference time by using the latest reception time saved in step S3331 (step S3332). In step S3332, the reference time is updated by using the latest (last) among reception times of a plurality of frames that were received over a range of times for which the determination result was regarded as OK. Instead of this, for example, the reference time may be updated by using the initial reception time among reception times of a plurality of frames that were received over a range of times for which the determination result was regarded as OK. Alternatively, the reference time may be updated by using a reception time among the reception times of the plurality of frames that is the closest to a time obtained by adding the period to the original reference time before the update.

Subsequently to step S3332, the frame determination unit saves, as the latest reception time, a value given by reference time+period (step S3333), and then ends the frame period determination process S3330. In step S3333, instead of the value given by reference time+period, a certain time within a range from a value given by reference time+period−margin to a value given by reference time+period+margin may be saved as the latest reception time.

According to a first modification of the first embodiment, the determination results for all the frames within the range of reference time+period±margin are regarded as OK, which may prevent a frame that conforms to a rule from being erroneously determined to be unauthorized.

1.21 Second Modification of First Embodiment

Figure 20:
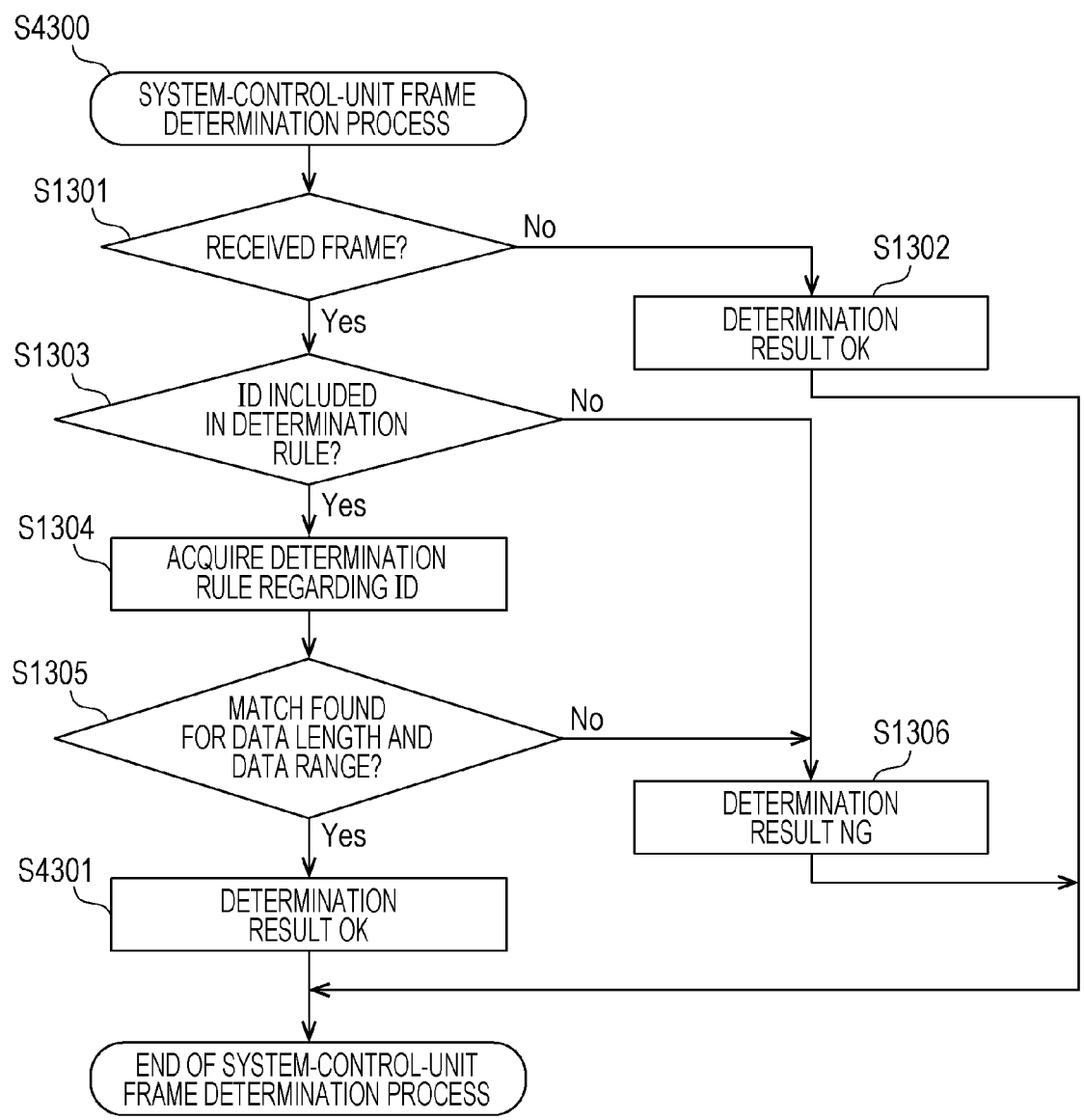
FIG. 20 is a flowchart illustrating a frame determination process performed in a system control unit according to a second modification of the first embodiment.
Figure 21:
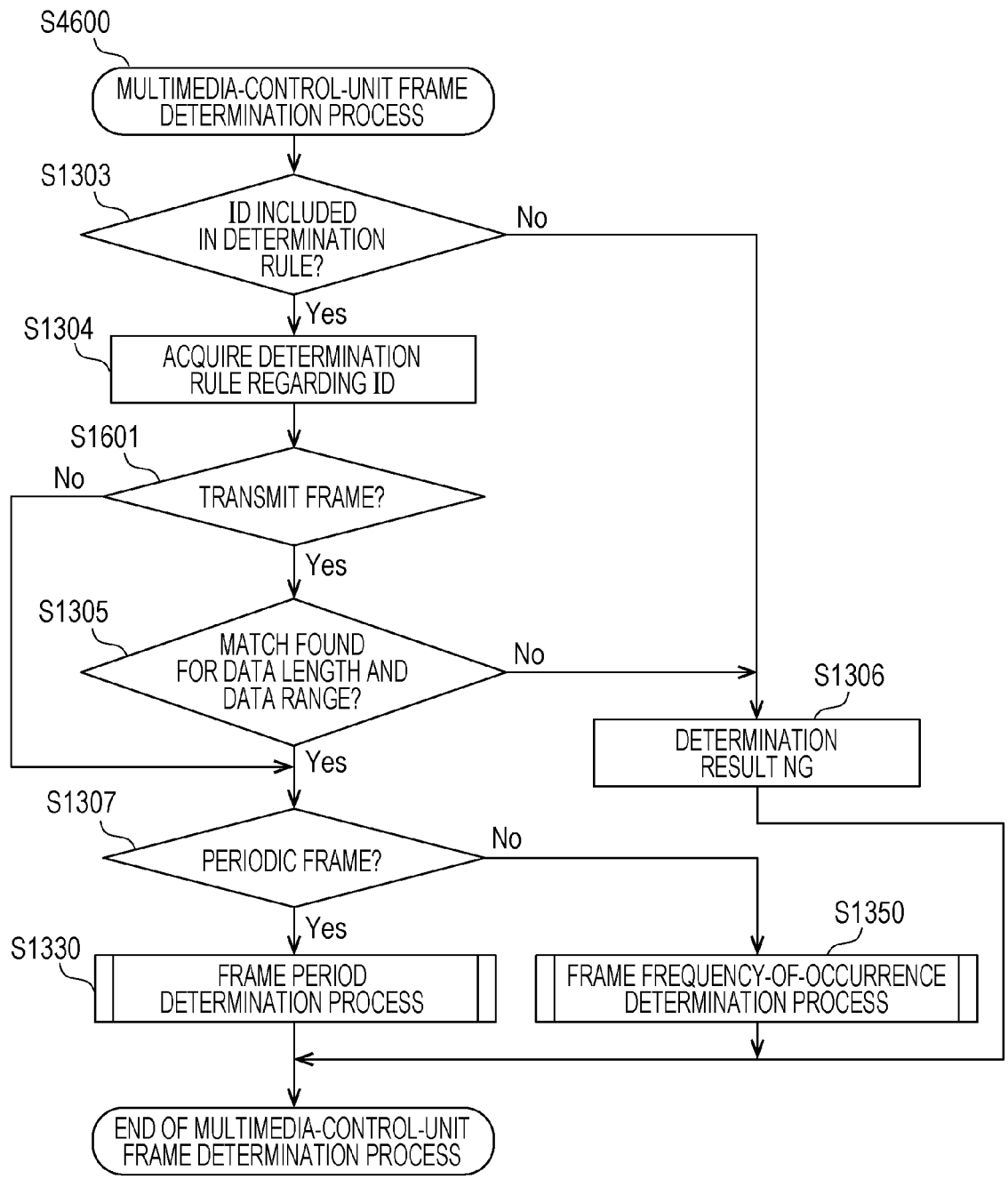
FIG. 21 is a flowchart illustrating a frame determination process performed in a multimedia control unit according to the second modification of the first embodiment.

The frame determination unit 115 of the system control unit 110 and the frame determination unit 152 of the multimedia control unit 150 may share the frame determination process (the determination of conformity with a determination rule) in a way different from that described above (FIG. 15, see FIG. 16). FIG. 20 and FIG. 21 illustrate another example of sharing according to a second modification of the first embodiment.

FIG. 20 is a flowchart illustrating a system-control-unit frame determination process S4300 as a modification of the system-control-unit frame determination process S1300. In the system-control-unit frame determination process 84300, steps S1301 to S1306 have the same or substantially the same content as those in the system-control-unit frame determination process S1300 (FIG. 15) described above, and are not described herein.

If it is determined in step S1305 that the frame to be determined conforms to both the criterion for the data length and the criterion for the data range, the frame determination unit 115 regards the determination result as OK (normal) (step S4301), and then ends the system-control-unit frame determination process.

The system-control-unit frame determination process 84300 does not include the frame period determination process S1330 or the frame frequency-of-occurrence determination process 81350 of the system-control-unit frame determination process S1300 (FIG. 15).

FIG. 21 is a flowchart illustrating a multimedia-control-unit frame determination process S4600 as a modification of the multimedia-control-unit frame determination process S1600. In the multimedia-control-unit frame determination process S4600, steps S1303 to S1307, S1601, S1330, and S1350 have the same or substantially the same content as those in the multimedia-control-unit frame determination process S1600 (FIG. 16) described above and are not described, as appropriate.

The frame determination unit 152 checks whether or not an ID that matches the ID of the frame to be determined is included in the determination rule (see FIG. 6) (step S1303). If the ID is included, the frame determination unit 152 acquires the individual categories in the determination rule regarding the ID (step S1304). If an ID that matches the ID of the frame to be determined is not included in the determination rule, the frame determination unit 152 regards the determination result as NG (step S1306), and then ends the multimedia-control-unit frame determination process.

The frame determination unit 152 identifies whether the target to be determined is a transmit frame or a received frame (step S1601). If the target to be determined is a transmit frame, the frame determination unit 152 determines whether or not the frame to be determined conforms to the criteria for the categories, namely, the data length and the data range, in the determination rule, which are acquired in step S1304 (step S1305). Upon being notified of data (a received frame) by the unit-to-unit communication processing unit 151, the frame determination unit 152 identifies the target to be determined as a received frame. Upon being notified of data (the content of a transmit frame) by the application execution unit 154, the frame determination unit 152 identifies the target to be determined as a transmit frame. If the frame to be determined does not conform to one of the criterion for the data length and the criterion for the data range in step S1305, the frame determination unit 152 regards the determination result as NG (step S1306), and then ends the multimedia-control-unit frame determination process.

If it is determined in step S1305 that the frame to be determined conforms to both the criterion for the data length and the criterion for the data range or if the target to be determined is identified as a received frame in step S1601, the frame determination unit 152 identifies whether or not the frame to be determined is a periodically transmitted or received frame (step S1307). If the frame to be determined is identified as a periodically transmitted or received frame, the frame determination unit 152 performs a frame period determination process (step S1330). If the frame to be determined is identified as not being a periodically transmitted or received frame, the frame determination unit 152 performs a frame frequency-of-occurrence determination process (step S1350).

In the second modification of the first embodiment, accordingly, in the multimedia-control-unit frame determination process S4600, not only a transmit frame but also a received frame is subjected to either of the frame period determination process S1330 and the frame frequency-of-occurrence determination process S1350. That is, in the second modification, as compared to the first embodiment, the role of part of processing for a received frame (such as the frame period determination process S1330 and the frame frequency-of-occurrence determination process S1350) is shifted from the system control unit 110 to the multimedia control unit 150. the second modification is effective when, for example, the multimedia control unit has higher performance than the system control unit. Accordingly, it is useful to distribute the load of a process for determining the conformity of a frame with a rule in accordance with the processing capacities of each control unit.

1.22 Third Modification of First Embodiment

There will now be described a third modification, as still another example, in which the frame determination unit 115 of the system control unit 110 and the frame determination unit 152 of the multimedia control unit 150 share the frame determination process (the determination of conformity with a determination rule) (see FIG. 15 and FIG. 16) in a different way.

Figure 22:
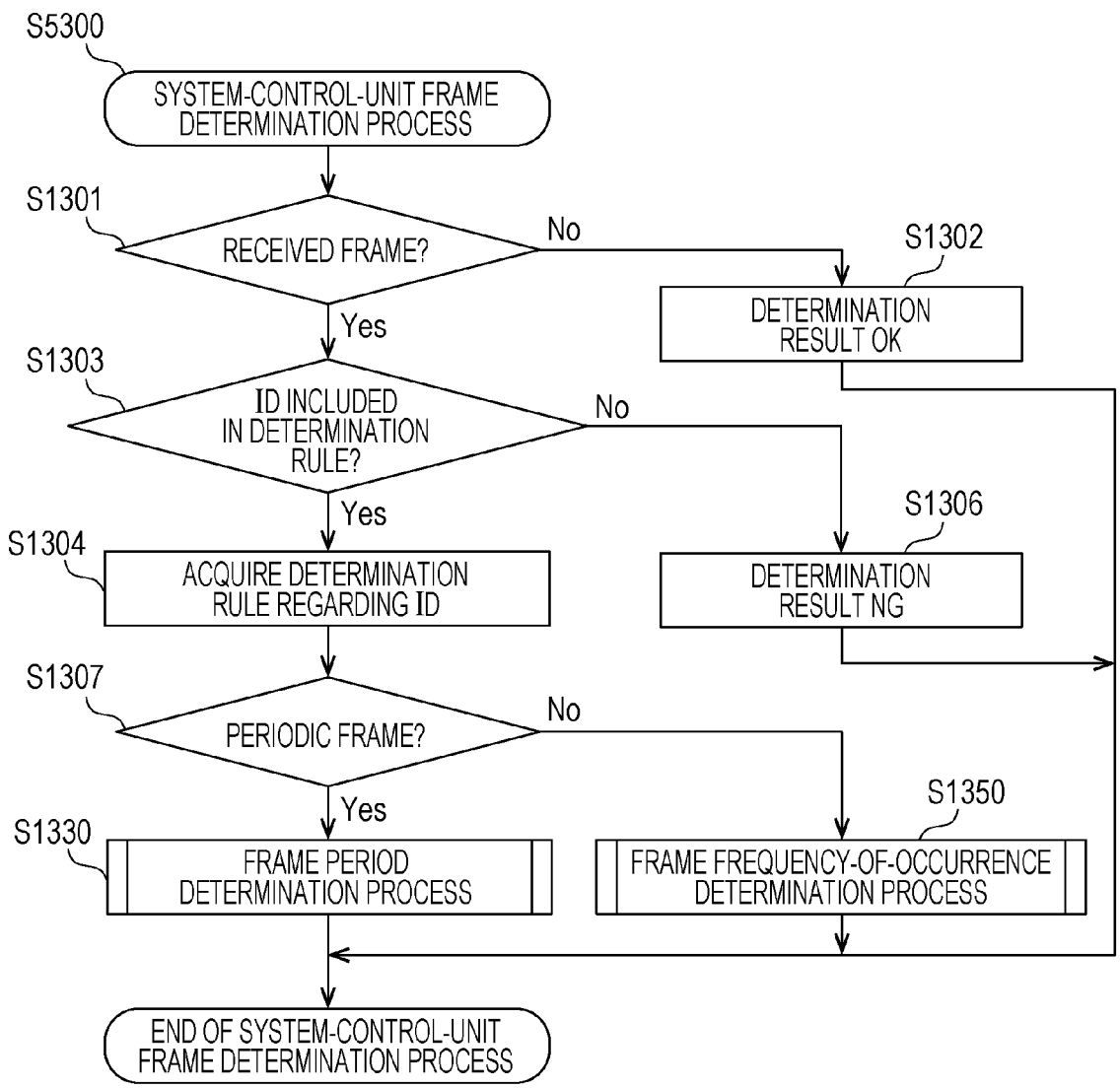
FIG. 22 is a flowchart illustrating a frame determination process performed in a system control unit according to a third modification of the first embodiment.

FIG. 22 is a flowchart illustrating a system-control-unit frame determination process S5300 as another modification of the system-control-unit frame determination process S1300. In the system-control-unit frame determination process S5300, steps S1301 to S1304, S1306, S1307, S1330, and S1350 have the same or substantially the same content as those in the system-control-unit frame determination process S1300 (FIG. 15) described above, and are not described herein, as appropriate.

After step S1304, the frame determination unit 115 identifies whether or not the frame to be determined is a periodically transmitted or received frame (step S1307).

The system-control-unit frame determination process S5300 does not include step S1305 of the system-control-unit frame determination process S1300 (FIG. 15) for determining whether or not the frame to be determined conforms to the criteria for the data length and the data range in the determination rule.

Figure 23:
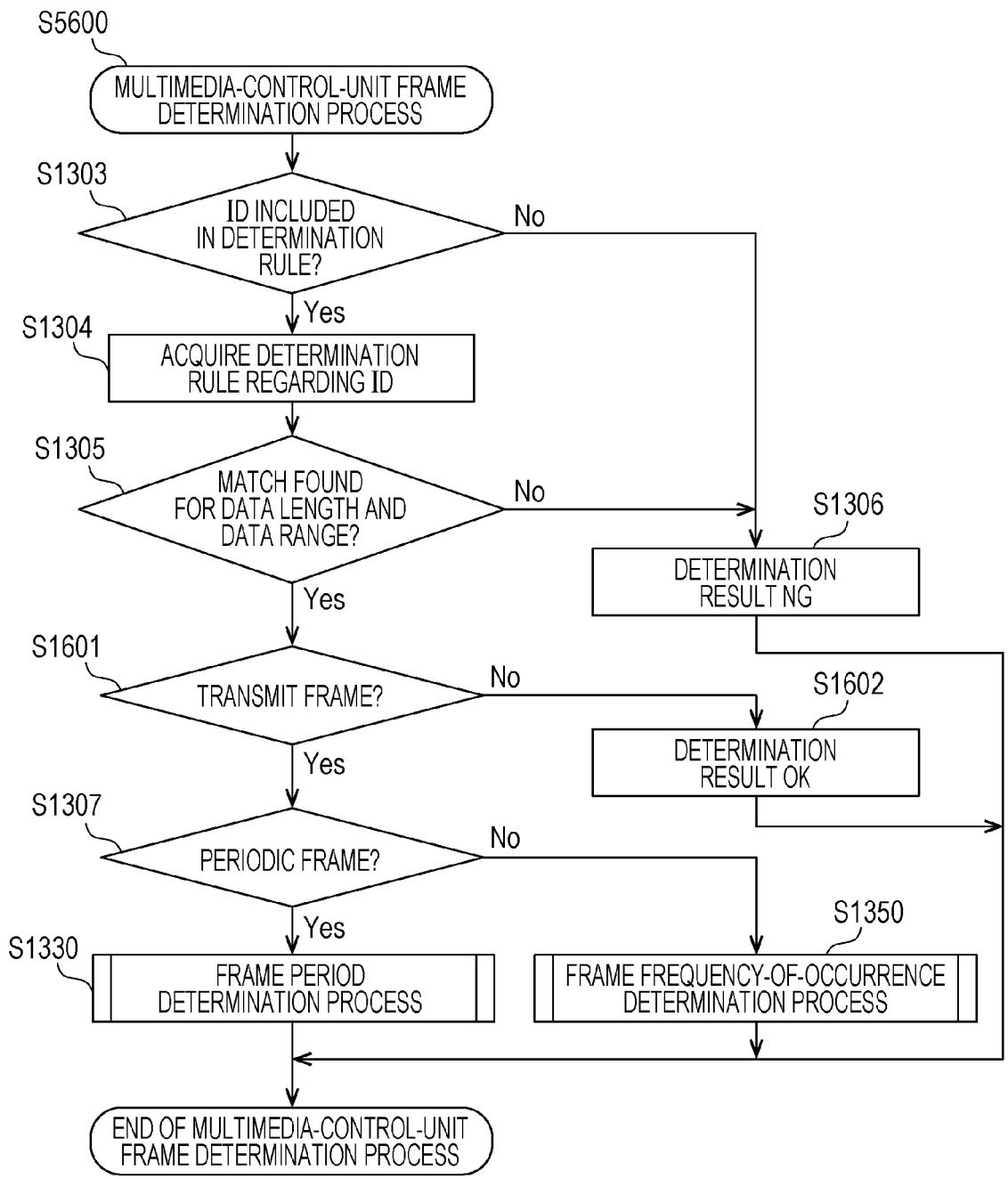
FIG. 23 is a flowchart illustrating a frame determination process performed in a multimedia control unit according to the third modification of the first embodiment.

FIG. 23 is a flowchart illustrating a multimedia-control-unit frame determination process S5600 as another modification of the multimedia-control-unit frame determination process S1600. In the multimedia-control-unit frame determination process S5600, steps S1303 to S1307, S1601, S1602, S1330, and S1350 have the same or substantially the same content as those in the multimedia-control-unit frame determination process S1600 (FIG. 16) described above, and are not described herein, as appropriate.

The frame determination unit 152 checks whether or not an ID that matches the ID of the frame to be determined is included in the determination rule (see FIG. 6) (step S1303). If the ID is included, the frame determination unit 152 acquires the individual categories in the determination rule regarding the ID (step S1304). If an ID that matches the ID of the frame to be determined is not included in the determination rule, the frame determination unit 152 regards the determination result as NG (step S1306), and then ends the multimedia-control-unit frame determination process.

Subsequently to step S1304, the frame determination unit 152 determines whether or not the frame to be determined conforms to the criteria for the categories, namely, the data length and the data range, in the determination rule (step S1305). If the frame to be determined does not conform to one of the criterion for the data length and the criterion for the data range in step S1305, the frame determination unit 152 regards the determination result as NG (step S1306), and then ends the multimedia-control-unit frame determination process.

If it is determined in step S1305 that the frame to be determined conforms to both the criterion for the data length and the criterion for the data range, the frame determination unit 152 identifies whether the target to be determined is a transmit frame or a received frame (step S1601). If the target to be determined is a received frame rather than a transmit frame, the frame determination unit 152 regards the determination result as OK (step S1602), and then ends the multimedia-control-unit frame determination process. If the target to be determined is a transmit frame, the process proceeds to step S1307.

In the third modification of the first embodiment, accordingly, in the multimedia-control-unit frame determination process S5600, not only a transmit frame but also a received frame is subjected to step S1305 for determining whether or not the frame to be determined conforms to the criteria for the data length and the data range in the determination rule. That is, in the third modification, as compared to the first embodiment, the role of part of processing for a received frame (step S1305) is shifted from the system control unit 110 to the multimedia control unit 150. the third modification is effective when, for example, the multimedia control unit has higher performance than the system control unit. In addition, out of the system control unit 110 and the multimedia control unit 150, the system control unit 110, which earlier processes a received frame from the bus 200, determines the conformity of the received frame with the rule category (criterion) for the period or the frequency of occurrence. This allows the determination to be performed accurately without being affected by a delay and the like caused by transmission between the two units. Accordingly, it is useful to appropriately distribute the load of a process for determining the conformity of a frame with a rule in accordance with the positional relationship between each control unit and the bus 200 and in accordance with the processing capacities of each control unit.

In the third modification, for example, a program stored in a memory on a chip that is the multimedia control unit 150 (first control unit) of the head unit 100 is executed by a processor to implement the function of a first determination unit that determines whether or not a transmit frame conforms to a first predetermined rule (such as the data length and the data range, or the period and the frequency of occurrence). If the first determination unit determines that the transmit frame does not conform to the first predetermined rule, information on the transmit frame is prevented from being transmitted from the first control unit to the system control unit 110 (second control unit). In addition, a program stored in a memory on a chip that is the system control unit 110 (second control unit) of the head unit 100 is executed by a processor to implement the function of a second determination unit that determines whether or not a received frame conforms to a second predetermined rule (such as the period and the frequency of occurrence). Furthermore, a program stored in a memory on a chip that is the multimedia control unit 150 is executed by a processor to implement the function of a third determination unit that determines whether or not a received frame conforms to a third predetermined rule (such as the data length and the data range). Note that the first determination unit and the third determination unit are constituent elements of the frame determination unit 152 and the second determination unit is a constituent element of the frame determination unit 115.

Second Embodiment

Hereinafter, as an embodiment of the present disclosure, an in-vehicle network system including a vehicle communication apparatus (head unit 2100) that performs a vehicle communication method for determining the conformity of frames with a rule, the frames including a transmit frame and the like to be delivered to a bus, and saving the determination result as a log will be described with reference to the drawings. The in-vehicle network system according to this embodiment is constructed by replacing the head unit 100 of the in-vehicle network system 10 illustrated in the first embodiment with a head unit 2100.

2.1 Configuration of Head Unit 2100

The head unit 2100 is a vehicle communication apparatus, similarly to the head unit 100, and is a kind of ECU disposed on, for example, an instrument panel or the like of an automobile, including a display device for displaying information to be viewed by a driver, an input means for accepting the operation of the driver, and so on.

Figure 24:
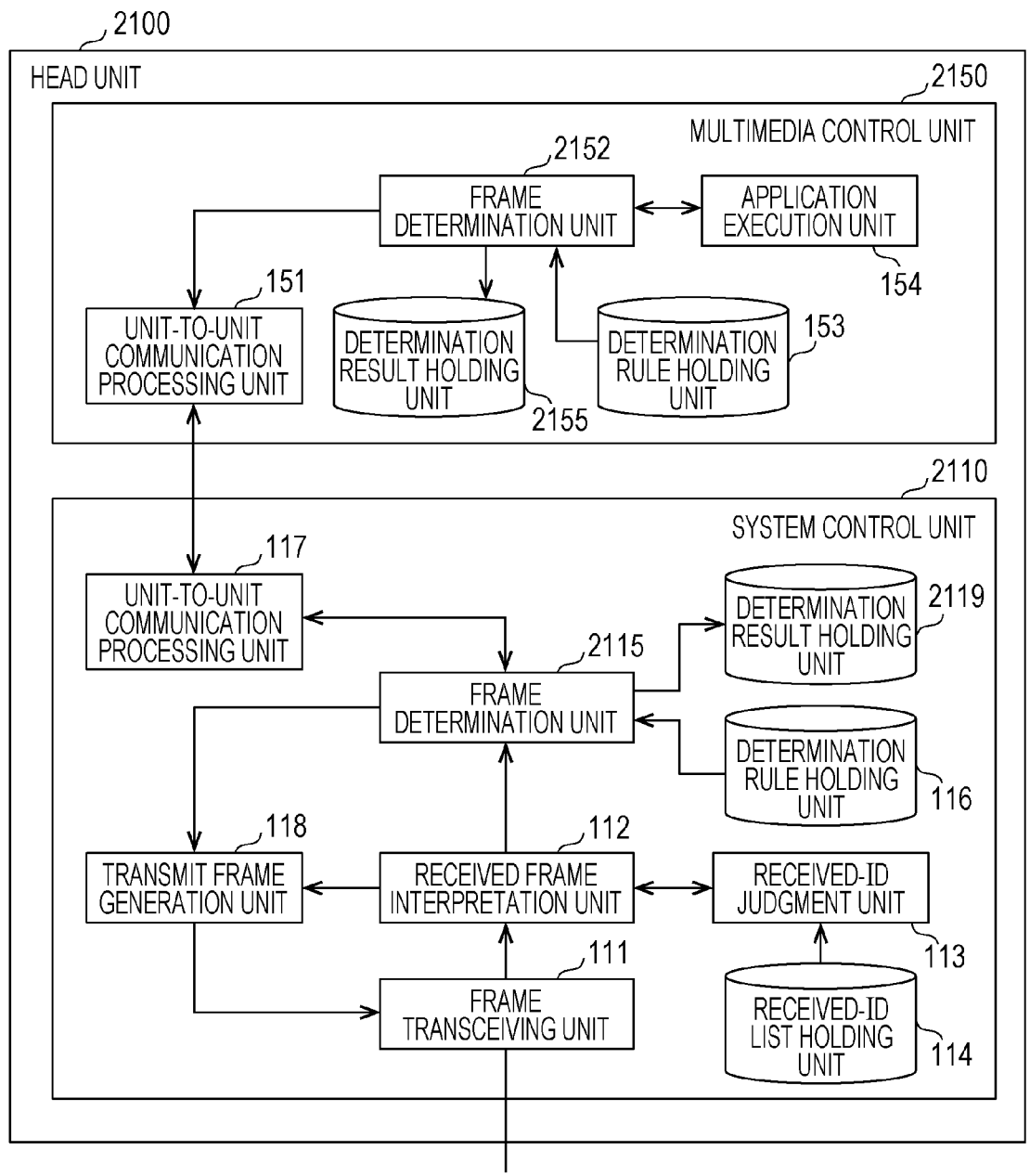
FIG. 24 is a configuration diagram of a head unit according to a second embodiment.

FIG. 24 is a configuration diagram of the head unit 2100. As illustrated in FIG. 24, the head unit 2100 is configured to include a system control unit 2110 and a multimedia control unit 2150. Constituent elements identical to or substantially identical to those illustrated in the first embodiment are assigned the same numerals, and are not described herein.

The system control unit 2110 is obtained by partially modifying the system control unit 110 illustrated in the first embodiment, and the multimedia control unit 2150 is obtained by partially modifying the multimedia control unit 150 illustrated in the first embodiment.

The system control unit 2110 mainly takes on control of communication via the bus 200, and is configured to include the frame transceiving unit 111, the received frame interpretation unit 112, the received-ID judgment unit 113, the received-ID list holding unit 114, a frame determination unit 2115, the determination rule holding unit 116, the unit-to-unit communication processing unit 117, the transmit frame generation unit 118, and a determination result holding unit 2119.

The frame determination unit 2115 receives the values of the frame received from the received frame interpretation unit 112 or receives from the unit-to-unit communication processing unit 117 values that are the content of a frame to be transmitted. Further, the frame determination unit 2115 acquires a determination rule from the determination rule holding unit 116, and notifies the determination result holding unit 2119 of information concerning the result of a frame determination process (system-control-unit frame determination process) based on the determination rule. The content of the system-control-unit frame determination process is the same or substantially the same as that illustrated in the first embodiment (see FIG. 15). Further, the frame determination unit 2115 notifies the transmit frame generation unit 118 or the unit-to-unit communication processing unit 117 of the values of the frame regardless of the result of the system-control-unit frame determination process.

The determination result holding unit 2119 is implemented by including a storage medium such as a memory, and, upon being notified of information concerning the result of the frame determination process by the frame determination unit 2115, saves the information in the storage medium as a log. The information concerning the result of the frame determination process is information including the content of a frame to be determined and the determination result.

The multimedia control unit 2150 mainly takes on the process of executing and controlling an application program, and is configured to include the unit-to-unit communication processing unit 151, a frame determination unit 2152, the determination rule holding unit 153, the application execution unit 154, and a determination result holding unit 2155.

The frame determination unit 2152 receives from the application execution unit 154 values that are the content of a frame to be transmitted or receives the values of the frame received from the unit-to-unit communication processing unit 151. Further, the frame determination unit 2152 acquires a determination rule from the determination rule holding unit 153, and notifies the determination result holding unit 2155 of information concerning the result of a frame determination process (multimedia-control-unit frame determination process) based on the determination rule. The content of the multimedia-control-unit frame determination process is the same or substantially the same as that illustrated in the first embodiment (see FIG. 16), Further, the frame determination unit 2152 notifies the application execution unit 154 or the unit-to-unit communication processing unit 151 of the values of the frame regardless of the result of the multimedia-control-unit frame determination process.

The determination result holding unit 2155 is implemented by including a storage medium such as a memory, and, upon being notified of information concerning the result of the frame determination process (information including the content of a frame to be determined and the determination result) by the frame determination unit 2152, saves the information in the storage medium as a log.

2.2 Frame Reception Operation Performed by Head Unit 2100

Figure 25:
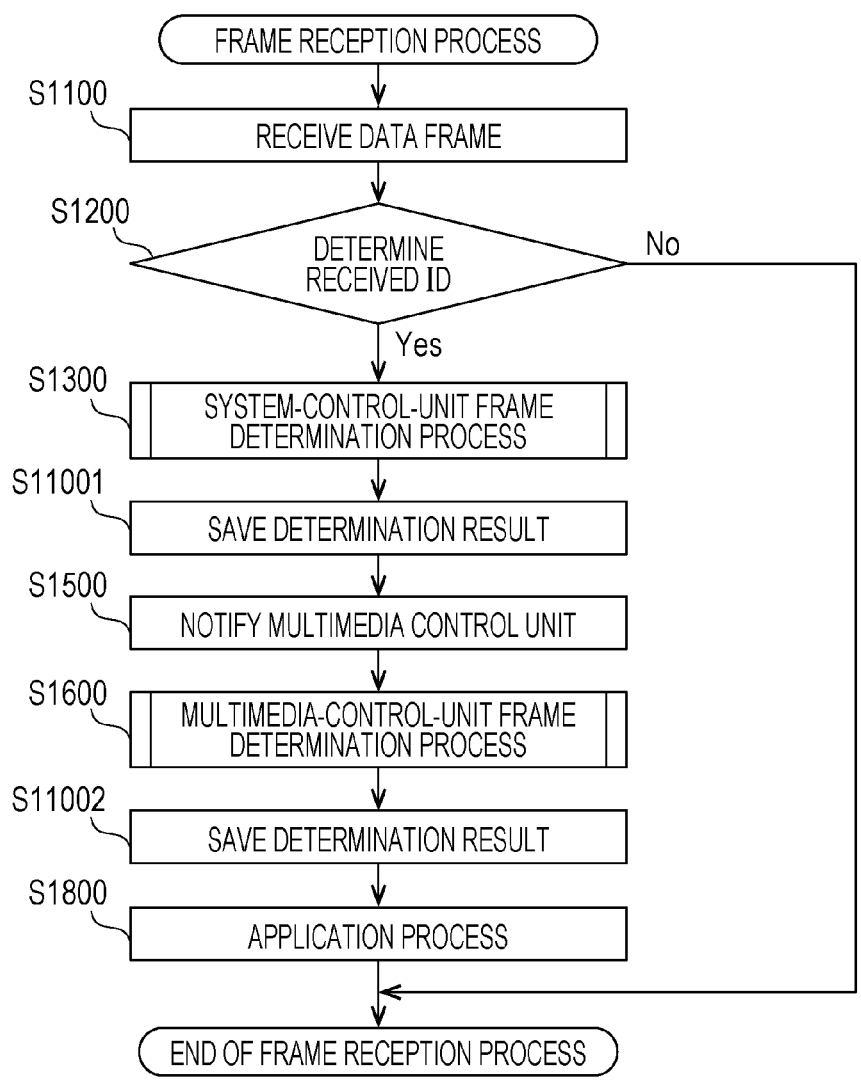
FIG. 25 is a flowchart illustrating an example of a frame reception process performed in the head unit according to the second embodiment.

FIG. 25 is a flowchart illustrating an example of a frame reception process performed in the head unit 2100. As illustrated in FIG. 25, the frame reception process performed in the head unit 2100 includes the same or substantially the same processing as that in steps S1100, S1200, S1300, S1500, S1600, and S1800 of the frame reception process performed in the head unit 100 (see FIG. 13). The same or substantially the same processing is not described herein, as appropriate.

Subsequently to the system-control-unit frame determination process S1300, the frame determination unit 2115 in the system control unit 2110 of the head unit 2100 notifies the determination result holding unit 2119 of information concerning the determination result (information including the content of a frame to be determined and the determination result) to cause the information to be saved as a log (step S11001). Then, the system control unit 2110 notifies the multimedia control unit 2150 of the content of the frame (received frame) by using a unit-to-unit communication process (step S1500).

Further, subsequently to the multimedia-control-unit frame determination process S1600, the frame determination unit 2152 in the multimedia control unit 2150 of the head unit 2100 notifies the determination result holding unit 2155 of information concerning the determination result (information including the content of a frame to be determined and the determination result) to cause the information to be saved as a log (step S11002). Then, the frame determination unit 2152 notifies the application execution unit 154 of the content of the received frame.

2.3 Frame Transmission Operation Performed by Head Unit 2100

Figure 26:
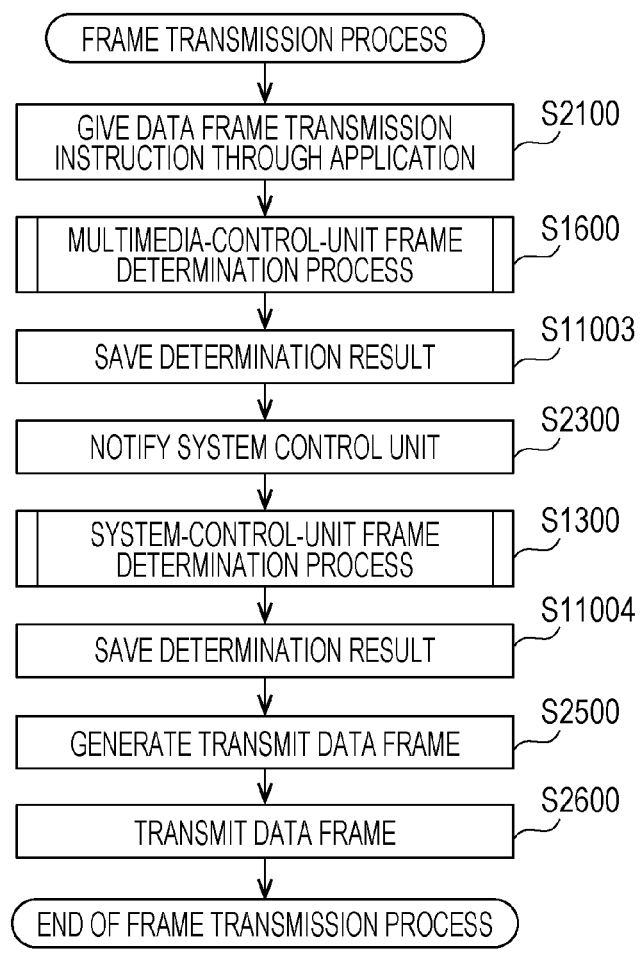
FIG. 26 is a flowchart illustrating an example of a frame transmission process performed in the head unit according to the second embodiment.

FIG. 26 is a flowchart illustrating an example of a frame transmission process performed in the head unit 2100. As illustrated in FIG. 26, the frame transmission process performed in the head unit 2100 includes the same or substantially the same processing as that in steps S2100, S1600, S2300, S1300, S2500, and S2600 of the frame transmission process performed in the head unit 100 (see FIG. 14). The same or substantially the same processing is not described herein, as appropriate.

Subsequently to the multimedia-control-unit frame determination process S1600, the frame determination unit 2152 in the multimedia control unit 2150 of the head unit 2100 causes the determination result holding unit 2155 to save information concerning the determination result (information including the content of a frame to be determined and the determination result) in a log (step S11003). Then, the multimedia control unit 2150 notifies the system control unit 2110 of the content of the frame (transmit frame) by using a unit-to-unit communication process (step S2300).

Further, subsequently to the system-control-unit frame determination process S1300, the frame determination unit 2115 in the system control unit 2110 of the head unit 2100 causes the determination result holding unit 2119 to save information concerning the determination result (information including the content of a frame to be determined and the determination result) in a log (step S11004). Then, the transmit frame generation unit 118 generates a transmit frame (data frame) on the basis of the content of the transmit frame (the content designated by the multimedia control unit 2150 in accordance with the application program) (step S2500).

2.4 Advantageous Effects of Second Embodiment

In the head unit 2100 of the in-vehicle network system according to the second embodiment, the conformity of a frame to be transmitted or received with a plurality of rule categories (criteria) such as the frequency of occurrence and the period is determined, and the results of the determination are saved as logs. The saved logs can be collected and analyzed for, for example, reassessment of the individual criteria in the determination rule, providing an improvement in the accuracy of frame determination, and so on. The result of the reassessment of the individual criteria in the determination rule may be utilized for the manufactures of an apparatus and the like constituting an in-vehicle network system or for the update of information used in the apparatus, such as data and programs, for example.

Third Embodiment

Hereinafter, as an embodiment of the present disclosure, an in-vehicle network system including a vehicle communication apparatus (head unit 3100) that performs a vehicle communication method for determining the conformity of frames with a rule, the frames including a transmit frame and the like to be delivered to a bus, and providing (transmitting) notification of the determination result to a server (computer) located outside the vehicle will be described with reference to the drawings. An in-vehicle network system 10a according to this embodiment is constructed by replacing the head unit 100 of the in-vehicle network system 10 illustrated in the first embodiment with a head unit 3100.

3.1 Overall Configuration of Network System 30

Figure 27:
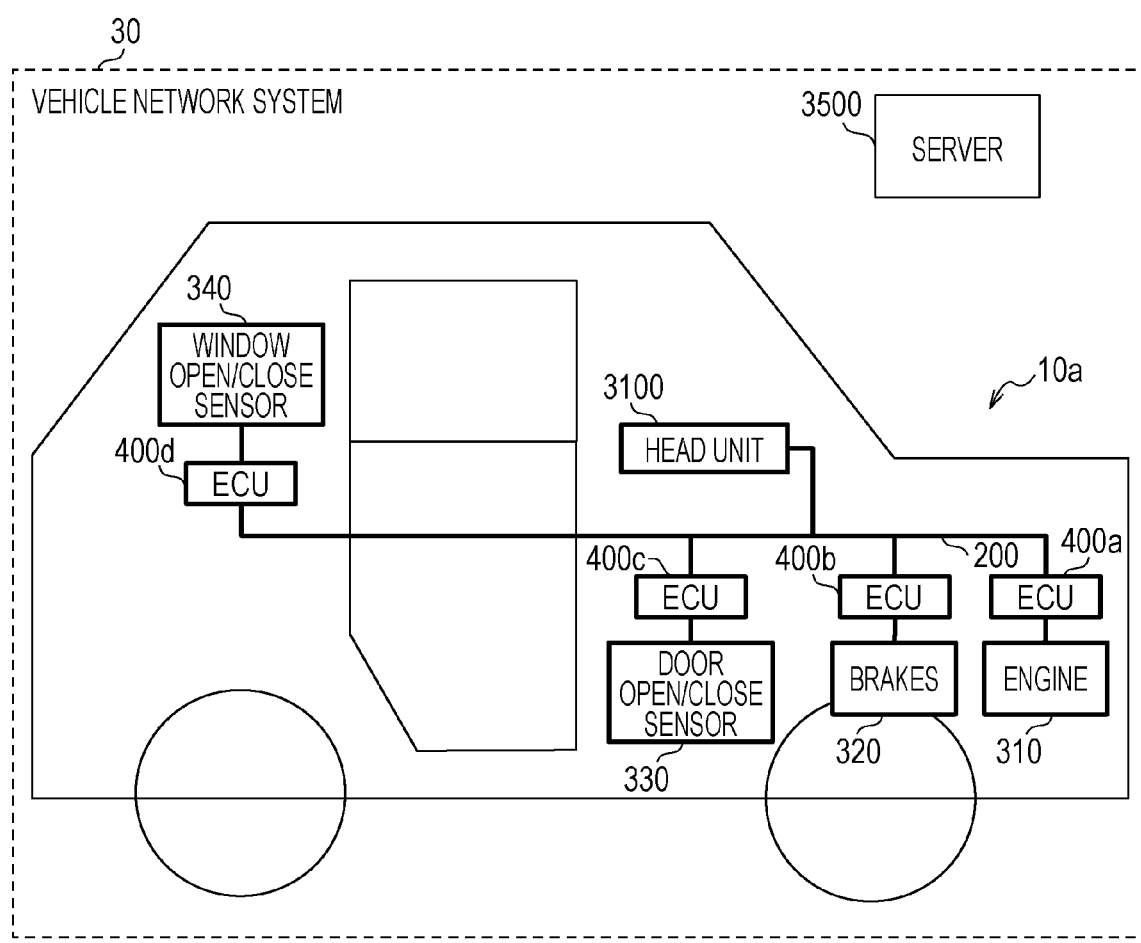
FIG. 27 is a diagram illustrating an overall configuration of a network system according to a third embodiment.

FIG. 27 is a diagram illustrating an overall configuration of a network system 30 according to the present disclosure. The network system 30 is configured to include an in-vehicle network system 10a mounted in a vehicle, and a server 3500 located outside the vehicle.

The in-vehicle network system 10a is obtained by partially modifying the in-vehicle network system 10, and is configured to include the bus 200, the head unit 3100, and nodes connected to the bus 200, called ECUs, such as the ECUs 400a to 400d connected to various devices. Among the constituent elements of the in-vehicle network system 10a, constituent elements identical to or substantially identical to those of the in-vehicle network system 10 (see FIG. 1) are assigned the same numerals, and are not described herein. In the in-vehicle network system 10a, the ECUs, including the head unit 3100, exchange frames in accordance with the CAN protocol.

The head unit 3100 is a vehicle communication apparatus, similarly to the head unit 100, and is a kind of ECU disposed on, for example, an instrument panel or the like of an automobile, including a display device for displaying information to be viewed by a driver: an input means for accepting the operation of the driver, and so on. The head unit 3100 has a function of receiving frames transmitted from the ECUs 400a to 400d and displaying various states on a display (not illustrated) to present the states to a user. The head unit 3100 further has a function of generating a frame indicating each piece of information acquired by the head unit 3100 and transmitting the frame to one or more ECUs via the bus 200. The head unit 3100 further has a function of determining the conformity of a frame to be transmitted or received with a rule to, for example, identify whether or not the frame is an unauthorized frame (that is, a frame that does not conform to the rule), and providing (transmitting) notification of information concerning the determination result to the server 3500. The head unit 3100 is also a kind of ECU.

The server 3500 is a device (server device) capable of communicating with the head unit 3100, and is a computer having a function of receiving and collecting information concerning the determination results of frames from the head unit 3100.

3.2 Configuration of Head Unit 3100

Figure 28:
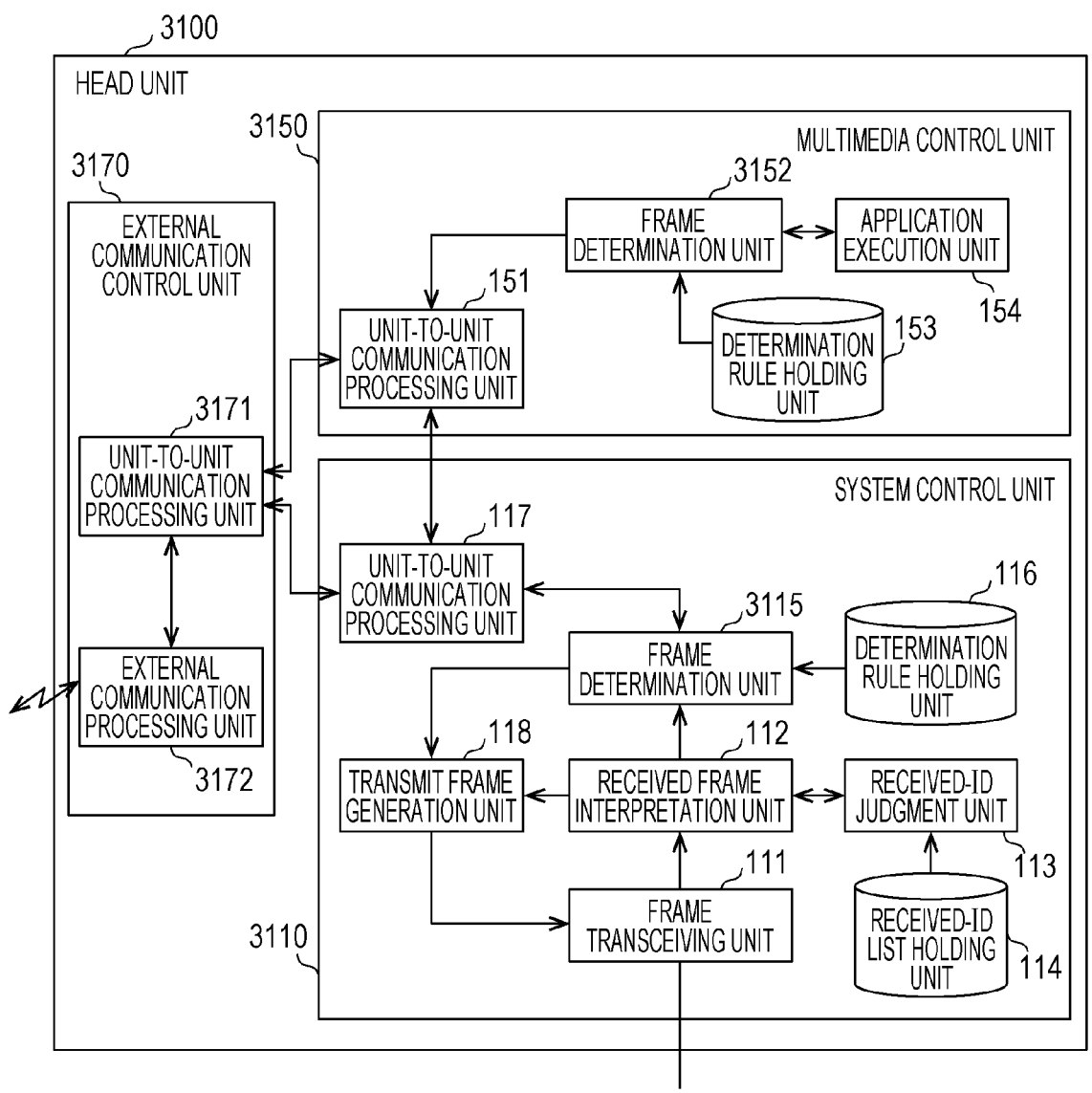
FIG. 28 is a configuration diagram of a head unit according to the third embodiment.

FIG. 28 is a configuration diagram of the head unit 3100. The head unit 3100 is configured to include a system control unit 3110, a multimedia control unit 3150, and an external communication control unit 3170. Constituent elements identical to or substantially identical to those illustrated in the first embodiment are assigned the same numerals, and are not described herein.

The system control unit 3110 is obtained by partially modifying the system control unit 110 illustrated in the first embodiment, and the multimedia control unit 3150 is obtained by partially modifying the multimedia control unit 150 illustrated in the first embodiment.

The system control unit 3110 mainly takes on control of communication via the bus 200, and is configured to include the frame transceiving unit 111, the received frame interpretation unit 112, the received-ID judgment unit 113, the received-ID list holding unit 114, a frame determination unit 3115, the determination rule holding unit 116, the unit-to-unit communication processing unit 117, and the transmit frame generation unit 118.

The frame determination unit 3115 receives the values of the frame received from the received frame interpretation unit 112 or receives from the unit-to-unit communication processing unit 117 values that are the content of a frame to be transmitted. Further, the frame determination unit 3115 acquires a determination rule from the determination rule holding unit 116, and notifies the unit-to-unit communication processing unit 117 of information concerning the result of a frame determination process (system-control-unit frame determination process) based on the determination rule to notify the external communication control unit 3170 of the information. The content of the system-control-unit frame determination process is the same or substantially the same as that illustrated in the first embodiment (see FIG. 15). Further, the frame determination unit 3115 notifies the transmit frame generation unit 118 or the unit-to-unit communication processing unit 117 of the values of the frame regardless of the result of the system-control-unit frame determination process.

The multimedia control unit 3150 mainly takes on the process of executing and controlling an application program, and is configured to include the unit-to-unit communication processing unit 151, a frame determination unit 3152, the determination rule holding unit 153, and the application execution unit 154.

The frame determination unit 3152 receives from the application execution unit 154 values that are the content of a frame to be transmitted or receives the values of the frame received from the unit-to-unit communication processing unit 151. Further, the frame determination unit 3152 acquires a determination rule from the determination rule holding unit 153, and notifies the unit-to-unit communication processing unit 151 of information concerning the result of a frame determination process (multimedia-control-unit frame determination process) based on the determination rule to notify the external communication control unit 3170 of the information. The content of the multimedia-control-unit frame determination process is the same or substantially the same as that illustrated in the first embodiment (see FIG. 16). Further, the frame determination unit 3152 notifies the application execution unit 154 or the unit-to-unit communication processing unit 151 of the values of the frame regardless of the result of the multimedia-control-unit frame determination process.

The external communication control unit 3170 is a chip different from the system control unit 3110 and the multimedia control unit 3150, for example, and is configured to include, as functional constituent elements, a unit-to-unit communication processing unit 3171 and an external communication processing unit 3172. These functional constituent elements are each implemented by elements integrated on a chip, such as a communication circuit, a memory, a processor that executes a control program stored in the memory, and other circuits.

The unit-to-unit communication processing unit 3171 performs a communication process between different units. Specifically, the unit-to-unit communication processing unit 3171 exchanges information with the system control unit 3110 or the multimedia control unit 3150 via wired or wireless communication.

The external communication processing unit 3172 has a function to perform wireless communication with the server 3500 located outside the vehicle and, upon being notified of information concerning the determination result of a frame by the unit-to-unit communication processing unit 3171, provides (transmits) notification of the information to the server 3500.

3.3 Frame Reception Operation Performed by Head Unit 3100

Figure 29:
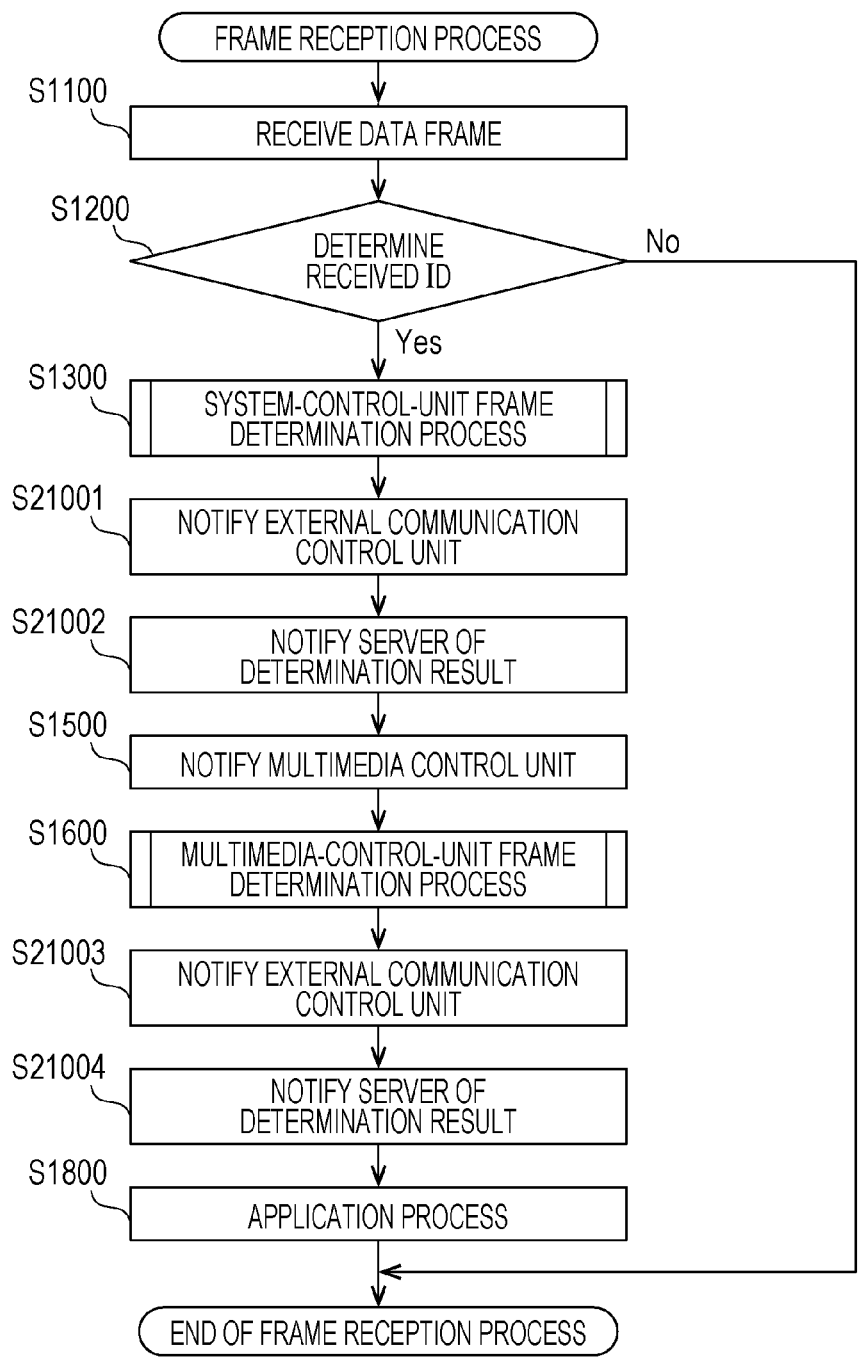
FIG. 29 is a flowchart illustrating an example of a frame reception process performed in the head unit according to the third embodiment.

FIG. 29 is a flowchart illustrating an example of a frame reception process performed in the head unit 3100. As illustrated in FIG. 29, the frame reception process performed in the head unit 3100 includes the same or substantially the same processing as that in steps S1100, S1200, S1300, S1500, S1600, and S1800 of the frame reception process performed in the head unit 100 (see FIG. 13). The same or substantially the same processing is not described herein, as appropriate.

Subsequently to the system-control-unit frame determination process S1300, the frame determination unit 3115 in the system control unit 3110 of the head unit 3100 notifies the external communication control unit 3170 of information concerning the determination result (information including the content of a frame to be determined and the determination result) via the unit-to-unit communication processing unit 117 (step S21001). In response to this notification, the external communication control unit 3170 notifies the server 3500 of the information concerning the determination result through the external communication processing unit 3172 (step S21002). Then, the system control unit 3110 notifies the multimedia control unit 3150 of the content of the frame (received frame) by using a unit-to-unit communication process (step S1500).

Subsequently to the multimedia-control-unit frame determination process S1600, the frame determination unit 3152 in the multimedia control unit 3150 of the head unit 3100 notifies the external communication control unit 3170 of information concerning the determination result (information including the content of a frame to be determined and the determination result) via the unit-to-unit communication processing unit 151 (step S21003). In response to this notification, the external communication control unit 3170 notifies the server 3500 of the information concerning the determination result through the external communication processing unit 3172 (step S21004). Then, the frame determination unit 3152 notifies the application execution unit 154 of the content of the received frame.

3.4 Frame Transmission Operation Performed by Head Unit 3100

Figure 30:
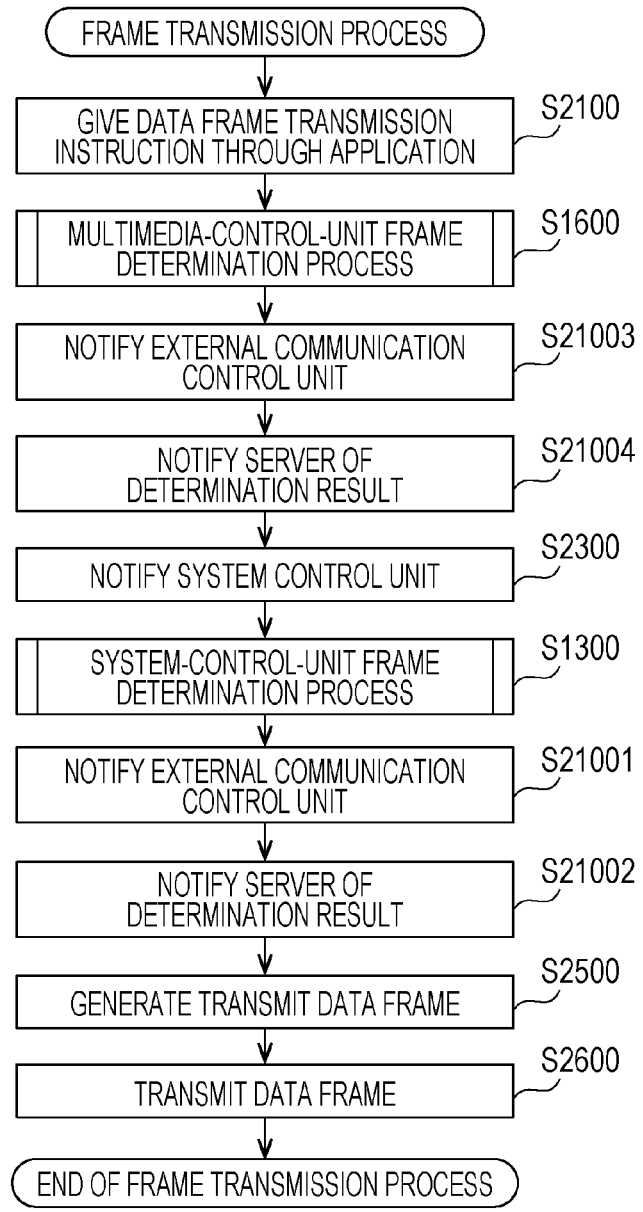
FIG. 30 is a flowchart illustrating an example of a frame transmission process performed in the head unit according to the third embodiment.

FIG. 30 is a flowchart illustrating an example of a frame transmission process performed in the head unit 3100. As illustrated in FIG. 30, the frame transmission process performed in the head unit 3100 includes the same or substantially the same processing as that in steps S2100, S1600, S2300, S1300, S2500, and S2600 of the frame transmission process performed in the head unit 100 (see FIG. 14). The same or substantially the same processing is not described herein, as appropriate.

Subsequently to the multimedia-control-unit frame determination process S1600, the frame determination unit 3152 in the multimedia control unit 3150 of the head unit 3100 notifies the external communication control unit 3170 of information concerning the determination result (information including the content of a frame to be determined and the determination result) via the unit-to-unit communication processing unit 151 (step 321003). In response to this notification, the external communication control unit 3170 notifies the server 3500 of the information concerning the determination result through the external communication processing unit 3172 (step S21004). Then, the multimedia control unit 3150 notifies the system control unit 3110 of the content of the frame (transmit frame) by using a unit-to-unit communication process (step S2300).

Subsequently to the system-control-unit frame determination process S1300, the frame determination unit 3115 in the system control unit 3110 of the head unit 3100 notifies the external communication control unit 3170 of information concerning the determination result (information including the content of a frame to be determined and the determination result) via the unit-to-unit communication processing unit 117 (step S21001). In response to this notification, the external communication control unit 3170 notifies the server 3500 of the information concerning the determination result through the external communication processing unit 3172 (step S21002). Then, the transmit frame generation unit 118 generates a transmit frame (data frame) on the basis of the content of the transmit frame (the content designated by the multimedia control unit 3150 in accordance with the application program) (step 32500).

3.5 Advantageous Effects of Third Embodiment

The head unit 3100 of the in-vehicle network system 10*a* according to the third embodiment determines the conformity of a frame to be transmitted or received with a plurality of rule categories (criteria) such as the frequency of occurrence and the period, and transmits information concerning the result of the determination to the server 3500. The server 3500 can collect and analyze the information concerning the result of the determination for, for example, reassessment of the individual criteria in the determination rule, providing an improvement in the accuracy of frame determination, and so on. The result of the reassessment of the individual criteria in the determination rule may be utilized for the manufactures of an apparatus and the like constituting an in-vehicle network system or for the update of information used in the apparatus, such as data and programs, for example.

Other Embodiments

As described above, Embodiments 1 to 3 have been described as illustrative examples of the technique according to the present disclosure. However, the technique according to the present disclosure is not limited to these embodiments and is also applicable to embodiments in which modifications, replacements, additions, omissions, and others are made as desired. For example, the following modifications are also included in embodiments of the present disclosure.

(1) In the embodiments described above, a data frame in the CAN protocol is configured in the standard ID format. The data frame may be in an extended ID format. In the extended ID format, an ID (message ID) is expressed in 29 bits in which the base ID at the ID position in the standard ID format and an ID extension are combined. This 29-bit ID may be handled as an ID (message ID) in the embodiments described above.

(2) In the embodiments described above, the number of margins to be used in a frame period determination process is specified to be one. However, a plurality of margins may be used. In addition, determination results obtained by using the individual margins may be handled as being identical, or determination results obtained by using the individual margins may be assigned weights. In addition, processing after the determination results have been obtained may differ depending on the margin. For example, the determination result of a frame that falls within a first margin range may be merely recorded as a log, and the determination result of a frame that falls within a second margin range may be used for filtering and the transmission or reception process of the frame may be prevented when the frame is determined to be unauthorized. In addition, the value of a margin in a determination rule is not limited to a fixed value, and may be a computational formula. Furthermore, the value of a margin may be dynamically changed in accordance with the total number of frame processing operations for all the IDs.

(3) In the embodiments described above, the number of threshold values (threshold frequency-of-occurrence values) to be used in a frame frequency-of-occurrence determination process is specified to be one. However, a plurality of threshold values may be used. In addition, determination results obtained by using the individual threshold values may be handled as being identical, or determination results obtained by using the individual threshold values may be assigned weights. In addition, processing after the determination results have been obtained may differ depending on the threshold value. For example, the determination result of a frame using a first threshold value may be merely recorded as a log, and the determination result of a frame that corresponds to a second threshold value may be used for filtering and the transmission or reception process of the frame may be prevented when the frame is determined to be unauthorized. In addition, a threshold frequency-of-occurrence value in a determination rule is not limited to a fixed value, and may be a computational formula. Furthermore, a threshold frequency-of-occurrence value may be dynamically changed in accordance with the total number of frame processing operations for all the IDs.

(4) In the embodiments described above, two types of determination results, namely, OK (normal) and NG (unauthorized), are used for the determination of the conformity of frames with the criterion for the period. Alternatively, a plurality of types of determination results more than two types of determination results may be used. For example, as in the first modification of the first embodiment, in a case where the reception of a plurality of frames is allowed within a certain margin range, a notification of reception of the plurality of frames may be included in a determination result. Alternatively, the conformity with each category (criterion) in a determination rule may be represented by the degree of conformity with respect to a certain evaluation criterion (such as a conformity of 100% or a conformity of 80%), and the resulting degree of conformity may be used as a determination result.

(5) In the embodiments described above, the frame determination process is divided into a section to be performed by a system control unit and a section to be performed by a multimedia control unit. Alternatively, the frame determination process may be performed by only one of them. In addition, a vehicle communication apparatus that is an ECU, such as a head unit, may not necessarily determine the conformity of a received frame with a rule so long as the vehicle communication apparatus determines the conformity of a transmit frame with a rule. In the embodiments described above, furthermore, the frame determination process is divided into sections to be performed by separate units on the basis of the discrimination of a received frame and a transmit frame, by way of example. However, the frame determination process may be divided on the basis of the discrimination of the ID, the timing, or the like. Alternatively, portions that perform frame determination (the determination of the conformity of a frame with a rule) may be located at a plurality of separate locations in the same unit. For example, frame determination may be divided on a per-application-program basis, or may be divided on a per-OS basis when a plurality of operating systems (OSs) operate on the same chip. Alternatively, a plurality of locations at which frame determination is feasible may be provided and a location at which frame determination is to be actually performed may be dynamically selected in accordance with the processing load on the entire system, how frequently frame processing is performed, and so on. In addition, the multimedia control unit and the system control unit may share the determination of the conformity of a received frame or a transmit frame with a rule in any way. That is, each unit may take charge of the determination regarding any rule category (criterion). It is sufficient that a vehicle communication apparatus that is an ECU, such as a head unit, which is connected to a bus in an in-vehicle network system include a multimedia control unit (first control unit) that identifies a transmit frame which is a frame to be delivered to the bus, and a system control unit (second control unit) that is capable of communicating with the first control unit via wired or wireless connection to exchange information on frames, and it is also sufficient that at least one of the first control unit and the second control unit be configured to determine the conformity of a transmit frame or the like with a rule. In addition, the first control unit may include a first determination unit that determines whether or not a transmit frame conforms to a first predetermined rule (for example, a criterion for any one of the categories in the determination rule in FIG. 6), and the second control unit may include a second determination unit that determines whether or not a received frame conforms to a second predetermined rule (for example, a criterion for any one of the categories in the determination rule in FIG. 6).

(6) In the embodiments described above, the numbers of periods and margins in a determination rule to be used in a frame period determination process are each specified to be one for each ID. However, the numbers of periods and margins may be each specified for each group of a plurality of IDs. In addition, but not limited to, a frame period determination process is performed once for each transmission or reception of one frame. Alternatively, a plurality of frame period determination processes having different determination content, such as a frame period determination process for all the IDs and a frame period determination process for each group, may be performed in combination.

(7) In the embodiments described above, the number of threshold values (threshold frequency-of-occurrence values) in a determination rule to be used in a frame frequency-of-occurrence determination process is specified to be one for each ID. However, the number of threshold values (threshold frequency-of-occurrence values) may be specified for each group of a plurality of IDs. In addition, but not limited to, a frame frequency-of-occurrence determination process is performed once for each transmission or reception of one frame. Alternatively, a plurality of frame frequency-of-occurrence determination processes having different determination content, such as a frame frequency-of-occurrence determination process for all the IDs and a frame frequency-of-occurrence determination process for each group, may be performed in combination.

(8) In the second embodiment described above, each unit (each of a system control unit and a multimedia control unit) includes a determination result holding unit. However, this configuration is not restrictive. Only one of them may include a determination result holding unit, or only a different independent unit (such as a chip) in the head unit may include a determination result holding unit. In addition, a storage medium (recording medium) in which the determination result holding unit saves a log may be an internal memory of the determination result holding unit or any other device such as a memory or a hard disk implemented by an external circuit, apparatus, or the like.

(9) In the second embodiment described above, it may be feasible to switch whether or not to save the determination result in a log in accordance with the determination result of the frame. Alternatively, the determination results of all the IDs may be saved or only the determination result of a specific ID may be saved. It may also be feasible to switch whether or not to save the determination result for each unit.

(10) In the third embodiment described above, the external communication control unit 3170 is used for communicating with a server. However, this configuration is not restrictive. Either or both of the system control unit 3110 and the multimedia control unit 3150 may include a configuration (such as an integrated circuit) for communicating with a server. In addition, information concerning the determination result of a frame may be transmitted from the system control unit 3110 not directly to the external communication control unit 3170 but via the multimedia control unit 3150 (the unit-to-unit communication processing unit 151).

(11) In the third embodiment described above, it may be feasible to switch whether or not to notify a server of the determination result in accordance with the determination result of the frame. Alternatively, the server may be notified of the determination results of all the IDs or the server may be notified of only the determination result of a specific ID. It may also be feasible to switch whether or not to notify the server of the determination result for each unit.

(12) In the third embodiment described above, each unit notifies a server of the determination result each time the unit performs a frame determination process. Alternatively, each unit may collectively notify the server of determination results of the frame determination process when a certain number of determination results are accumulated. Alternatively, each unit may notify the server of the determination result of a frame regularly at certain time intervals.

(13) The determination rule (see FIG. 6) illustrated in the embodiments described above is merely an example, and may include categories other than the rule categories described in the illustrative examples or may have values different from the values described in the illustrative examples. The determination rule may be set during the manufacture of a vehicle communication apparatus (for example, a head unit) or during shipment or the like, or may be set during shipment of a vehicle in which the in-vehicle network system is to be mounted. The determination rule may be updated during operation of the in-vehicle network system. The determination rule may also be set and updated through communication with an external device, set by using various recording media and the like, or set by using tools or the like.

(14) The CAN protocol illustrated in the embodiments described above may have a broad meaning including its derivative protocols, such as TTCAN (Time-Triggered CAN) and CAN FD (CAN with Flexible Data Rate).

(15) A head unit as an example of a vehicle communication apparatus in the embodiments described above is designed to include, for example, a chip of a semiconductor integrated circuit including a communication circuit, a memory, a processor, and other circuits, and so on, but may include other hardware constituent elements such as a hard disk device, a display, a keyboard, and a mouse. In addition, instead of a control program stored in a memory being executed by a processor to implement functions in software, the functions may be implemented by an integrated circuit without using a control program. The chip may not necessarily be packaged.

(16) Some or all of the constituent elements included in each device in the embodiments described above may be constituted by a single system LSI (Large Scale Integration). The system LSI is a super-multifunctional LSI manufactured by integrating a plurality of configuration units on a single chip, and is specifically a computer system configured to include a microprocessor, a ROM, a RAM, and so on. The RAM has recorded thereon a computer program. The microprocessor operates in accordance with the computer program, thereby allowing the system LSI to achieve its function. In addition, constituent units included in each device may be integrated into individual chips or into a single chip that includes some or all of the units. While the system LSI is used here, an integrated circuit may also be referred to as an IC, an LSI, a super LSI, or an ultra LSI depending on the difference in the degree of integration. In addition, a technique for forming an integrated circuit is not limited to the LSI, and may be implemented by using a dedicated circuit or a general-purpose processor. An FPGA (Field Programmable Gate Array) that can be programmed after the manufacture of the LSI or a reconfigurable processor capable of reconfiguring connection or setting of circuit cells in the LSI may be used. Additionally, if a technique for forming an integrated circuit is introduced in place of the LSI along with development in semiconductor technology or other derivative technology, it is a matter of course that the technique may be used for the integration of functional blocks. One potential approach is to apply biotechnology, for example.

(17) Some or all of the constituent elements included in each of the devices described above may be constituted by an IC card removably set in each device or a stand-alone module. The IC card or the module is a computer system constituted by a microprocessor, a ROM, a RAM, and so on. The IC card or the module may include the super-multi-functional LSI described above. The microprocessor operates in accordance with a computer program, thereby allowing the IC card or the module to achieve its function. This IC card or module may be tamper-resistant.

(18) An aspect of the present disclosure may provide the vehicle communication method described above. An aspect of the present disclosure may also provide a computer program for implementing this method by using a computer, or a digital signal including the computer program. In an aspect of the present disclosure, furthermore, the computer program or the digital signal may be recorded on a computer-readable recording medium such as a flexible disk, a hard disk, a CD-ROM, an MO, a DVD, a DVD-ROM, a DVD-RAM, a BD (Blu-ray (registered trademark) Disc), or a semiconductor memory. An aspect of the present disclosure may also provide the digital signal recorded on such recording media. In an aspect of the present disclosure, furthermore, the computer program or the digital signal may be transmitted via a telecommunication line, a wireless or wired communication line, a network represented by the Internet, data broadcasting, or the like. A further aspect of the present disclosure may provide a computer system including a microprocessor and a memory, in which the memory has recorded thereon the computer program described above and the microprocessor operates in accordance with the computer program. Moreover, the program or the digital signal may be recorded on the recording medium and transported, or the program or the digital signal may be transported via the network or the like, so as to be performed by any other independent computer system.

(19) Embodiments achieved by any combination of constituent elements and functions illustrated in the embodiments described above and the modifications described above also fall within the scope of the present disclosure.

The present disclosure can be used for reducing delivery of unauthorized frames to a bus within an in-vehicle network system.

What is claimed is:

1. An electronic control unit connected to an in-vehicle network in an in-vehicle network system, the in-vehicle network system including a plurality of apparatuses that performs communication of frames via the in-vehicle network, the electronic control unit comprising:
   a first control circuit; and
   a second control circuit,
   wherein the first control circuit is connected to the in-vehicle network via the second control circuit,
   wherein the first control circuit performs a first determination process on a frame that is transmitted to the in-vehicle network, and determines conformity of the frame with a first rule,
   wherein, upon determining that the frame conforms to the first rule, the first control circuit transmits the frame to the second control circuit,
   wherein the second control circuit performs a second determination process on the frame, that is received from the first control circuit, and determines conformity of the frame with a second rule,
   wherein, upon determining that the frame conforms to the second rule, the second control circuit transmits the frame to the in-vehicle network, and
   wherein the second control circuit performs the second determination process on the frame, that is received from the first control circuit, after the frame is received by the second control circuit from the first control circuit.

2. The electronic control unit according to claim 1, wherein the first rule specifies a condition for a period in which the frame is transmitted or a frequency of transmission or reception of the frame.

3. The electronic control unit according to claim 1, wherein the second rule specifies a condition for a message ID of the frame.

4. The electronic control unit according to claim 1, wherein
   the first control circuit does not transmit the frame to the second control circuit when the frame does not conform to the first rule.

5. The electronic control unit according to claim 1, wherein the first control circuit comprises a semiconductor integrated circuit including a first microprocessor and a first memory, and executes a first program, stored in the first memory, by the first microprocessor to perform the first determination process, and
   wherein the second control circuit comprises a semiconductor integrated circuit including a second microprocessor and a second memory, the second microprocessor having a lower processing performance than the first microprocessor, and executes a second program, stored in the second memory, by the second microprocessor to perform the second determination process.

6. The electronic control unit according to claim 1, wherein information indicating a result of the first determination process and a result of the second determination process is transmitted to an external server.

7. The electronic control unit according to claim 1, wherein information indicating a result of the first determination process and a result of the second determination process is recorded on a predetermined recording medium.

8. The electronic control unit according to claim 1, wherein the plurality of apparatuses includes the electronic control unit, and the plurality of apparatuses performs the communication of frames in accordance with a Controller Area Network protocol.

9. The electronic control unit according to claim 1, wherein the first control circuit is a multimedia control circuit that executes and controls an application program, and
   wherein the second control circuit is a system control circuit that controls communication via the in-vehicle network.

10. The electronic control unit according to claim 1, wherein the electronic control unit is a vehicle communication apparatus.

11. The electronic control unit according to claim 2, wherein the first rule further specifies a condition for a type of data included in the frame.

12. The electronic control unit according to claim 2, wherein the second rule specifies a condition for a period in which the frame is transmitted or a frequency of transmission or reception of the frame.

13. The electronic control unit according to claim 3, wherein the second rule further specifies a condition for a period in which the frame is transmitted or a frequency of transmission or reception of the frame.

14. The electronic control unit according to claim 11, wherein the second rule specifies a condition for a period in which the frame is transmitted or a frequency of transmission or reception of the frame.

15. An in-vehicle network system comprising
a plurality of apparatuses that performs communication of frames via an in-vehicle network,
wherein at least one of the plurality of apparatuses comprises an electronic control unit connected to the in-vehicle network,
wherein the electronic control unit at least includes a first control circuit and a second control circuit,
wherein the first control circuit is connected to the in-vehicle network via the second control circuit,
wherein the first control circuit performs a first determination process on a frame that is transmitted to the in-vehicle network, and determines conformity of the frame with a first rule,
wherein, upon determining that the frame conforms to the first rule, the first control circuit transmits the frame to the second control circuit,
wherein the second control circuit performs a second determination process on the frame, that is received from the first control circuit, and determines conformity of the frame with a second rule,
wherein, upon determining that the frame conforms to the second rule, the second control circuit transmits the frame to the in-vehicle network, and
wherein the second control circuit performs the second determination process on the frame, that is received from the first control circuit, after the frame is received by the second control circuit from the first control circuit.

16. A vehicle communication method for an in-vehicle network system including a plurality of apparatuses that performs communication of frames via an in-vehicle network, the plurality of apparatuses including an electronic control unit, the electronic control unit including a first control circuit and a second control circuit, the second control circuit configured to exchange information on frames with the first control circuit, the vehicle communication method comprising:
performing, by the first control circuit, a first determination process on a frame that is transmitted to the in-vehicle network, and determining conformity of the frame with a first rule;
transmitting, by the first control circuit and upon determining that the frame conforms to the first rule, the frame to the second control circuit;
performing, by the second control circuit, a second determination process on the frame, that is received from the first control circuit, and determining conformity of the frame with a second rule; and
transmitting, by the second control circuit and upon determining that the frame conforms to the second rule, the frame to the in-vehicle network,
wherein the second control circuit performs the second determination process on the frame, that is received from the first control circuit, after the frame is received by the second control circuit from the first control circuit.

* * * * *